(12) United States Patent
Miyahara et al.

(10) Patent No.: US 11,852,341 B2
(45) Date of Patent: Dec. 26, 2023

(54) HOT WATER SUPPLY DEVICE, HOT WATER SUPPLY PROGRAM, HOT WATER SUPPLY METHOD, AND RECORDING MEDIUM

(71) Applicant: PURPOSE CO., LTD., Fuji (JP)

(72) Inventors: Tsutomu Miyahara, Fuji (JP); Hidenori Kiuchi, Fuji (JP)

(73) Assignee: PURPOSE CO., LTD., Fuji (JP)

( * ) Notice: Subject to any disclaimer, the term of this patent is extended or adjusted under 35 U.S.C. 154(b) by 102 days.

(21) Appl. No.: 17/434,962

(22) PCT Filed: Dec. 23, 2019

(86) PCT No.: PCT/JP2019/050249
§ 371 (c)(1),
(2) Date: Aug. 30, 2021

(87) PCT Pub. No.: WO2020/179197
PCT Pub. Date: Sep. 10, 2020

(65) Prior Publication Data
US 2022/0136697 A1    May 5, 2022

(30) Foreign Application Priority Data

Mar. 7, 2019    (JP) ................. 2019-041931

(51) Int. Cl.
*F24H 15/36*    (2022.01)
*F23N 5/24*    (2006.01)
(Continued)

(52) U.S. Cl.
CPC ............. *F23N 5/242* (2013.01); *F23N 3/085* (2013.01); *F24H 15/365* (2022.01);
(Continued)

(58) Field of Classification Search
CPC .... F24H 15/116; F24H 15/128; F24H 15/174; F24H 15/156; F23N 3/085; F23N 5/242;
(Continued)

(56) References Cited

U.S. PATENT DOCUMENTS 4,819,587 A * 4/1989 Tsutsui .................... F23N 1/082
236/14
8,418,661 B2 * 4/2013 Kanda ..................... F23N 1/022
431/12
(Continued)

FOREIGN PATENT DOCUMENTS

FR    2800848 A1 *  5/2001 ........... F23D 14/045
JP    H04-073513 A    3/1992
(Continued)

OTHER PUBLICATIONS

Notification of Transmittal of Translation of the International Preliminary Report on Patentability (Form PCT/IB/338) issued in counterpart International Application No. PCT/JP2019/050249 dated Sep. 16, 2021 with Forms PCT/IB/373, PCT/IB/326 and PCT/ISA/237 with English translation. (15 pages).
(Continued)

*Primary Examiner* — Gregory A Wilson
(74) *Attorney, Agent, or Firm* — WHDA, LLP

(57) ABSTRACT

A hot water supply device includes: a combustion part including a first burner part for which a flame sensor is disposed and a second burner part having a different number of burners from the first burner part such that one or both of the burner parts perform combustion, the flame sensor being configured to detect combustion state information of a flame generated by burners; a combustion control part configured to monitor a combustion mode of the combustion part set in accordance with a hot water supply request and change a second combustion mode in which the first burner part does not perform combustion, to a first combustion mode in
(Continued)

which at least the first burner part performs combustion, when the second combustion mode is continuing; and a combustion adjustment control part configured to execute a combustion adjustment process of the combustion part.

15 Claims, 15 Drawing Sheets

(51) Int. Cl.
  *F24H 15/365* (2022.01)
  *F23N 3/08* (2006.01)
  *F24H 1/10* (2022.01)
(52) U.S. Cl.
  CPC ...... *F23N 2229/00* (2020.01); *F23N 2233/08* (2020.01); *F24H 1/107* (2013.01)
(58) Field of Classification Search
  CPC ............. F23N 2229/00; F24D 19/1006; F24D 19/1051; F24D 19/1063
  See application file for complete search history.

(56) References Cited

U.S. PATENT DOCUMENTS

| | | | |
|---|---|---|---|
| 9,291,364 B2* | 3/2016 | Okamoto | F23N 1/002 |
| 10,240,785 B2* | 3/2019 | Konishi | F23N 1/002 |
| 11,391,469 B2* | 7/2022 | Hasegawa | F24H 15/269 |
| 2014/0000534 A1 | 1/2014 | Naitoh et al. | |
| 2022/0136697 A1* | 5/2022 | Miyahara | F23N 1/022 122/14.2 |

FOREIGN PATENT DOCUMENTS

| | | | |
|---|---|---|---|
| JP | 9-89222 A | | 4/1997 |
| JP | 11-94279 A | | 4/1999 |
| JP | 11-294761 A | | 10/1999 |
| JP | 11294761 A | * | 10/1999 |
| JP | 2008-128575 A | | 6/2008 |
| JP | 2014-9840 A | | 1/2014 |
| JP | 2020085397 A | * | 6/2020 |

OTHER PUBLICATIONS

International Search Report dated Mar. 17, 2020, issued in counterpart International Application No. PCT/JP2019/050249, with English Translation. (5 pages).
Japanese Written Opinion of the International Searching Authority (Form PCT/ISA/237) dated Mar. 17, 2020, issued in counterpart International Application No. PCT/JP2019/050249 (4 pages).
Office Action dated Jul. 5, 2022, issued in counterpart JP application No. 2019-041931, with English translation. (7 pages).
Office Action dated Aug. 22, 2023, issued in counterpart JP application No. 2022-209375 with English translation. (7 pages).

* cited by examiner

A
[SECOND STAGE COMBUSTION]

B
[FIRST STAGE COMBUSTION]

C
[THIRD STAGE COMBUSTION]

COMBUSTION MODE SWITCHING TABLE 112

| | INFLOW WATER TEMPERATURE — Low ← → High | | | | | | | | | | |
|---|---|---|---|---|---|---|---|---|---|---|---|
| | Tα1 | Tα2 | Tα3 | Tα4 | Tα5 | Tα6 | Tα7 | Tα8 | Tα9 | Tα10 | Tα11 |
| Tβ1 | | | | | | | | | | | LX |
| Tβ2 | | | | | | | | | | LY | LX |
| Tβ3 | | | | | | | | | LY | LX | |
| Tβ4 | | | | | | | | LY | LX | | |
| Tβ5 | | | | | | | LY | LX | | | |
| Tβ6 | | | | | | LY | LX | | | | |
| Tβ7 | | | | | LY | LX | | | | | |
| Tβ8 | | | | LY | LX | | | | | | |
| Tβ9 | | | LY | LX | | | | | | | |
| Tβ10 | | LY | LX | | | | | | | | |
| Tβ11 | LY | LX | | | | | | | | | |
| Tβ12 | LX | | | | | | | | | | |
| Tβ13 | | | | | | | | | | | |
| Tβ14 | LY | | | | | | | | | | |
| Tβ15 | LX | | | | | | | | | | |
| Tβ16 | | | | | | | | | | | |
| Tβ17 | | | | | | | | | | | |
| Tβ18 | | | | | | | | | | | |

SET TEMPERATURE: High ↑ ↓ Low

P

HOT WATER SUPPLY DEVICE, HOT WATER SUPPLY PROGRAM, HOT WATER SUPPLY METHOD, AND RECORDING MEDIUM

TECHNICAL FIELD

The present invention relates to a combustion control technique for monitoring and adjusting a combustion state of a combustion part mounted on a hot water supply device.

BACKGROUND ART

In a known hot water supply device, multiple burners are divided into groups of several burners, and the divided burner groups are combined in accordance with a hot water supply request so as to perform combustion of one, some or all burners such that a required combustion amount is obtained (e.g., Patent Literature 1).

CITATION LIST

Patent Literature

Patent Literature 1: Japanese Laid-Open Patent Publication No. 2008-128575

SUMMARY OF INVENTION

Technical Problem

A hot water supply device regularly performs a process of monitoring a combustion state of a burner. This combustion state is greatly influenced by an amount of air supplied to the burner, an amount of $NO_x$ generated by combustion changes depending on a ratio of fuel gas and air, and an incomplete combustion state of the burner may occur. The hot water supply device performs a combustion improvement process depending on a combustion state monitoring result. A flame rod is used for monitoring the combustion status. However, in the combustion part of the hot water supply device, the number of installed flame rods is limited with respect to the number of burners due to costs and installation space. Therefore, the combustion part of the hot water supply device with the burners divided into groups of several burners has a group in which the combustion state cannot be monitored with the flame rod. For a burner in which the combustion state cannot be monitored in this way, the combustion state cannot be adjusted.

The hot water supply devices include, for example, a so-called single-pipe device supplying hot water only through a hot water supply pipe, and a central hot water supply device supplying hot water to multiple hot water supply loads. In such hot water supply devices, variations of the hot water supply loads are small, so that only the burner part without the flame rod may continuously perform combustion. In this case, the hot water supply device may continue to be unable to monitor the combustion state of the burner and improve the combustion.

Such a problem is not disclosed or suggested in Patent Literature 1, and cannot be solved by the configuration disclosed in Patent Literature 1.

Therefore, in view of the problem described above, an object of the present invention is to periodically monitor a combustion state of a burner and improve the combustion thereof regardless of a combustion mode corresponding to a hot water supply request.

Solution to Problem

To achieve the object, an aspect of a hot water supply device of the present invention includes: a combustion part including a first burner part for which a flame sensor is disposed and a second burner part having a different number of burners from the first burner part such that one or both of the burner parts perform combustion, the flame sensor being configured to detect combustion state information of a flame generated by burners;

a combustion control part configured to monitor a combustion mode of the combustion part set in accordance with a hot water supply request and change a second combustion mode in which the first burner part does not perform combustion, to a first combustion mode in which at least the first burner part performs combustion, when the second combustion mode is continuing; and a combustion adjustment control part configured to take in the combustion state information of the first burner part detected by the flame sensor and execute a combustion adjustment process of the combustion part.

The hot water supply device may further include a timer configured to measure an elapsed time, and when a set time has elapsed after setting the second combustion mode, the combustion control part may change the combustion part to perform combustion in the first combustion mode until a certain time elapses.

In the hot water supply device, when the combustion mode is changed due to a monitoring result indicating that the combustion is performed in the second combustion mode, the combustion control part may change a range of a combustion capacity of the burners performing combustion in the first combustion mode.

In the hot water supply device, the combustion control part may cause the combustion part to perform combustion in the first combustion mode at a start of a next combustion operation after the combustion in the second combustion mode is continuously set.

In the hot water supply device, the combustion control part may adjust a hot water supply set temperature or a water supply amount to change a combustion mode.

The hot water supply device may further include an air supply fan configured to supply air to the burners, and the combustion adjustment control part may adjust the number of rotations of the air supply fan so that a combustion state of the combustion part satisfies a set condition.

To achieve the object, an aspect of a computer readable recording medium of the present invention stores a hot water supply program for causing a computer to implement: a function of monitoring a combustion mode of a combustion part set in accordance with a hot water supply request; a function of changing a second combustion mode in which a first burner part does not perform combustion, to a first combustion mode in which at least the first burner part performs combustion, when the second combustion mode is continuing, a flame sensor being disposed for the first burner part, the flame sensor being configured to detect combustion state information of a flame; and a function of taking in the combustion state information of the first burner part detected by the flame sensor and executing a combustion adjustment process of the combustion part including the first burner part and a second burner part having a different number of burners from the first burner part.

In the computer readable recording medium, the hot water supply program may further cause the computer to implement: a function of measuring an elapsed time, and a function of changing the combustion part to perform combustion in the first combustion mode until a certain time elapses, when a set time has elapsed after setting the second combustion mode.

In the computer readable recording medium, the hot water supply program may further cause the computer to implement a function of changing a range of a combustion capacity of the burners configured to perform combustion in the first combustion mode when the combustion mode is changed due to a monitoring result indicating that the combustion is performed in the second combustion mode.

To achieve the object, an aspect of a hot water supply method of the present invention includes: monitoring a combustion mode of a combustion part set in accordance with a hot water supply request; changing a second combustion mode in which a first burner part does not perform combustion, to a first combustion mode in which at least the first burner part performs combustion, when the second combustion mode is continuing, a flame sensor being disposed for the first burner part, the flame sensor being configured to detect combustion state information of a flame; and taking in the combustion state information of the first burner part detected by the flame sensor and executing a combustion adjustment process of the combustion part including the first burner part and a second burner part having a different number of burners from the first burner part.

The hot water supply method may further include: measuring an elapsed time; and changing the combustion part to perform combustion in the first combustion mode until a certain time elapses, when a set time has elapsed after setting the second combustion mode.

The hot water supply method may further include changing a range of a combustion capacity of the burners configured to perform combustion in the first combustion mode when the combustion mode is changed due to a monitoring result indicating that the combustion is performed in the second combustion mode.

Advantageous Effects of Invention

According to the present invention, any of the following effects can be obtained.
(1) If combustion continues in a combustion mode in which the flame sensor cannot detect the combustion state, the combustion mode is changed to monitor the combustion state and improve combustion, so that the safety of the hot water supply device can be improved and an environmental load due to combustion can be reduced.
(2) A monitoring process is performed in accordance with the combustion mode corresponding to the hot water supply request by using the flame sensor disposed only for a portion of the burners part divided into multiple groups, so that the combustion state of the burners can be grasped while the number of parts is reduced.
(3) Regardless of combustion control according to the hot water supply request, the combustion state can regularly or quantitatively be monitored, and the reliability of the hot water supply device can be improved.
(4) In the combustion state monitoring process, a hot water supply temperature can be prevented from becoming lower or higher than a set temperature, and the hot water temperature can be stabilized.

Other objects, features, and advantages of the present invention will become more apparent by reference to the accompanying drawings and embodiments.

BRIEF DESCRIPTION OF DRAWINGS

FIG. 13 is a diagram showing an example of a combustion mode switching table.

DESCRIPTION OF EMBODIMENTS

First Embodiment

<Hot Water Supply Device 2>

Figure 1:
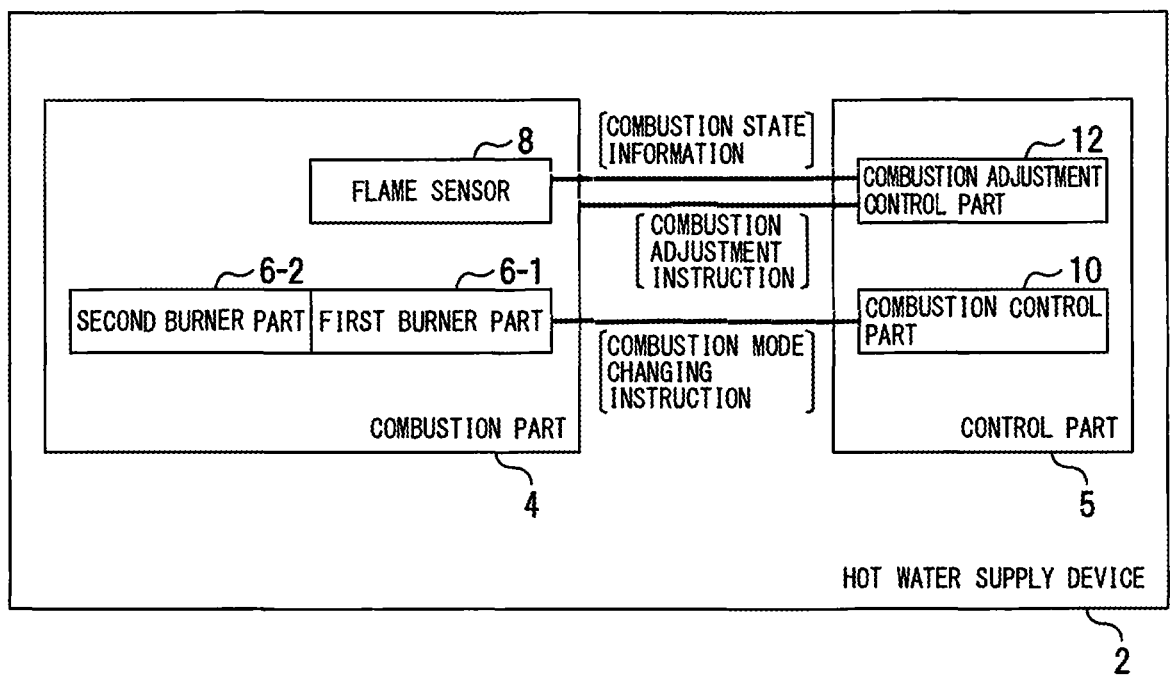
FIG. 1 is a diagram showing a configuration example of a hot water supply device according to a first embodiment.

FIG. 1 shows a configuration example of a hot water supply device according to a first embodiment. The configuration shown in FIG. 1 is an example, and the present invention is not limited to this configuration.

As shown in FIG. 1, the hot water supply device 2 includes a combustion part 4 combusting a fuel gas to generate a high-temperature combustion exhaust, and a control part 5 having at least a combustion control function, a combustion state monitoring function and an adjustment process function for the combustion part 4. In the hot water supply device 2, the combustion part 4 and the control part 5 may be housed in the same housing, or the control part 5 may be disposed outside a housing in which the combustion part 4 and a hot water supply function part not shown are housed.

The combustion part 4 includes, for example, multiple burners discharging an air-fuel mixture of a fuel gas G and air, and igniting and combusting the discharged air-fuel mixture. These burners may be the same or different in terms of discharge holes of the air-fuel mixture, and the number and size thereof, for example. The combustion part 4 adjusts a combustion amount by adjusting combinations of the numbers and types of burners discharging and burning the air-fuel mixture, and a flow rate of the air-fuel mixture discharged from the burners.

The burners of the combustion part 4 include a first burner part 6-1 and a second burner part 6-2 formed by dividing multiple burners into groups of several burners different in number.

The hot water supply device 2 causes hot water, water, or a heat transfer medium serving as a fluid to be heated to exchange heat with a combustion exhaust generated by either or both of the first burner part 6-1 and the second burner part 6-2, and discharges hot water, heats bathtub water, or supplies heat to other heat loads. The first burner part 6-1 and the second burner part 6-2 include the different numbers of burners. As a result, the first burner part 6-1 and the second burner part 6-2 have different combustion capacities and can perform combustion independently from or in combination with each other to achieve a hot water supply capacity corresponding to a hot water supply request.

The combustion part 4 has a flame sensor 8 disposed for the first burner part 6-1. The flame sensor 8 is an example of a means for detecting combustion state information of flame generated by the burner part 6-1, for example, and a flame rod (FR) is used as the flame sensor 8.

The control part 5 is an example of a functional part performing a hot water supply control of the hot water supply device 2, a combustion control of the combustion part 4, a process of monitoring the combustion state of the burners, a combustion improvement control, etc., and includes a combustion control part 10 and a combustion adjustment control part 12.

The combustion control part 10 is an example of a means for controlling the combustion state of the first burner part 6-1 and the second burner part 6-2, monitors the combustion state of the burners, and performs combustion improvement processes such as setting the combustion amounts of the first burner part 6-1 and the second burner part 6-2, setting the numbers of combustion stages, and giving instructions for changing a combustion mode etc.

The combustion adjustment control part 12 is an example of a means for monitoring the combustion state of the burners and adjusting a mixing ratio of the fuel gas G and air to adjust the combustion state. The control part 5 uses the combustion adjustment control part 12 to take in the combustion state information detected by the flame sensor 8 and determine the combustion state. The combustion adjustment control part 12 then outputs a combustion adjustment instruction to the combustion part 4 in accordance with a determination result.

<Combustion Stage Number of Burners>

For the combustion control of the burners, a combustion stage number is set on the combustion part 4 of the hot water supply device 2 to adjust the combustion amount required for a hot water supply request.

This combustion stage number includes, for example, first stage combustion in which only the first burner part 6-1 performs combustion, second stage combustion in which only the second burner part 6-2 performs combustion, and third stage combustion in which all burners perform combustion. The hot water supply capacity of the hot water supply device 2 is set in accordance with the combustion stage number of the combustion part 4. In a normal hot water supply operation, the first stage combustion has a small combustion amount and provides a combustion capacity of hot water supply capacity Nos. 3 to 8, for example. The second stage combustion has a medium combustion amount and provides a combustion capacity of hot water supply capacity Nos. 6 to 16, for example. The third stage combustion has a large combustion amount and provides a combustion capacity of hot water supply capacity Nos. 9 to 24, for example.

<Combustion State Monitoring Process>

Figure 2:
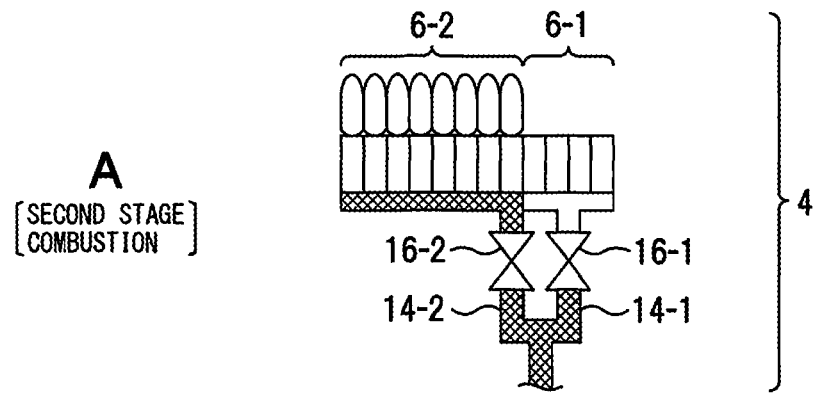
FIG. 2 is a diagram showing an example of a switching state of a combustion stage number.
Figure 2:
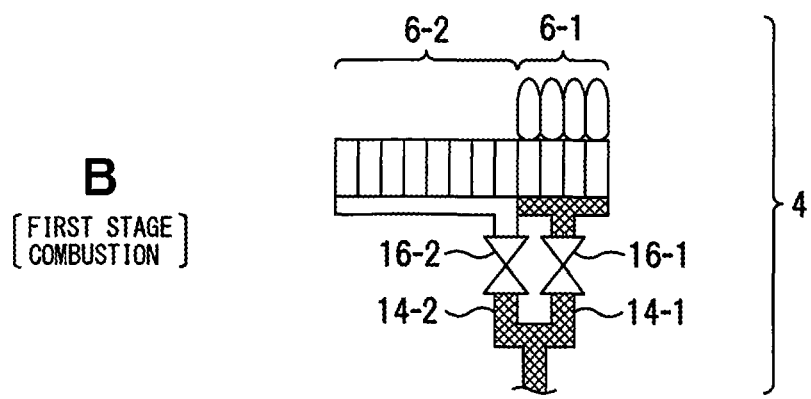
Figure 2:
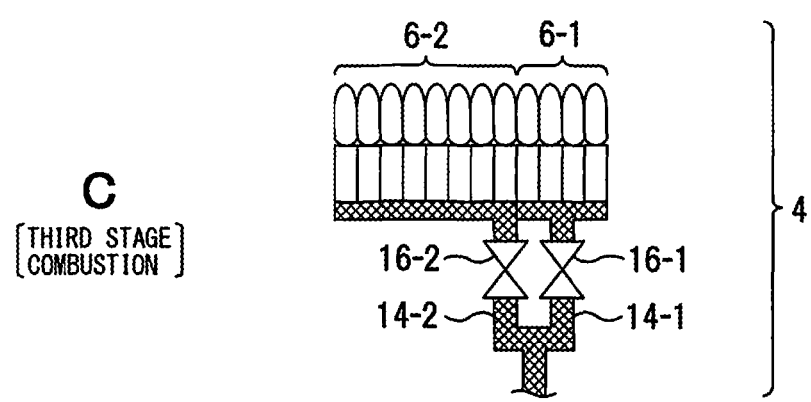

For example, as shown in A of FIG. 2, when the combustion part 4 performs the second stage combustion, the hot water supply device 2 is in a second combustion mode in which the combustion of the first burner part 6-1 is stopped, so that the combustion state cannot be monitored by the flame sensor 8. When the second combustion mode continues for a long time or the second combustion mode is intermittently performed so that a set cumulative time becomes equal to or longer than a certain time, the control part 5 provides the combustion control in a first combustion mode in which at least the first burner part 6-1 performs combustion. In this first combustion mode, a combustion of the combustion part 4 set to the second stage combustion is switched to the first stage combustion in which only the first burner part 6-1 performs combustion as shown in B of FIG. 2, for example, or to the third stage combustion in which the first burner part 6-1 performs combustion together with the second burner part 6-2 as shown in C of FIG. 2, for example.

The hot water supply device 2 includes, as a means for switching the combustion stage number and adjusting the combustion amount, gas supply pipes 14-1, 14-2 supplying the fuel gas G to the first burner part 6-1 and the second burner part 6-2, and switching valves 16-1, 16-2 allowing or blocking passage of flows in the gas supply pipes 14-1, 14-2. The control part 5 controls the opening/closing of the switching valves 16-1, 16-2 and controls a hot water supply gas proportional valve, which adjusts a gas flowing amount, to adjust the combustion amounts of the burner parts 6-1, 6-2, thereby responding to a wide range of hot water supply requests.

<Hot Water Supply Control>

Figure 3:
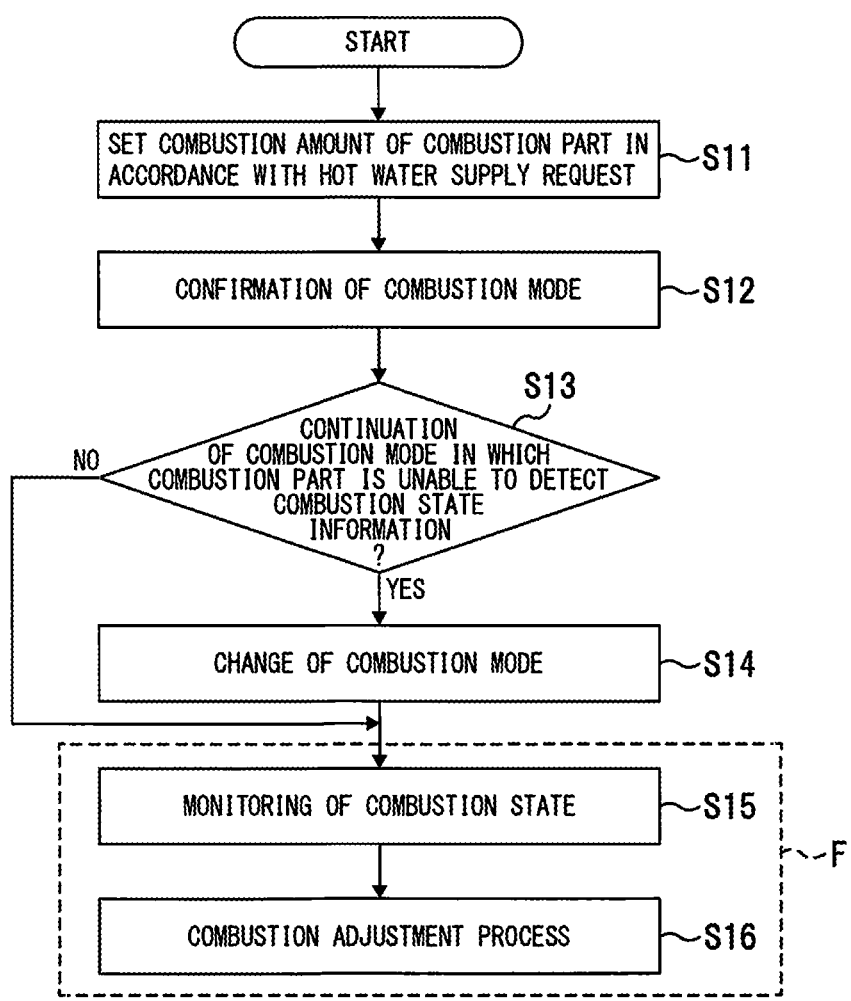
FIG. 3 is a flowchart showing an example of a hot water supply process.

FIG. 3 shows an example of a process procedure of the hot water supply control. The process procedure and process contents shown in FIG. 3 are examples, and the present invention is not limited to this configuration. This hot water supply process shows an example of a hot water supply program or a hot water supply method of the present invention.

The hot water supply device 2 sets the combustion amount of the combustion part 4 in accordance with a hot water supply request (S11). In this combustion amount setting process, the combustion amount is calculated from a hot water supply set temperature, an inflow water temperature, and an inflow water flow rate, for example. The control part 5 then sets the combustion stage number of the combustion part 4 in accordance with the calculated combustion amount.

For a process of monitoring the combustion part 4, the control part 5 confirms the combustion mode from the set combustion stage number (S12).

The control part 5 determines whether the combustion mode in which the combustion part 4 is unable to detect the combustion state information has continued for a predetermined time (S13). In other words, it is determined whether the second combustion mode is continuously set due to the second stage combustion. If the combustion mode in which it is unable to detect the combustion state information has continued (YES at S13), the control part 5 outputs an instruction for changing the combustion mode (S14). The control part 5 causes the combustion part 4 set to the second stage combustion to increase or decrease the combustion amount so that the burners perform the first stage combustion or the third stage combustion, for example. Furthermore, when changing the combustion mode of the combustion part 4, the control part 5 may change the combustion range of either or both of the first burner part 6-1 and the second burner part 6-2. Therefore, for example, the control part 5 selects the first stage combustion or the third stage combustion as the combustion capacity capable of responding to the hot water supply request and may raise the upper limit of the combustion range of the first stage combustion or lower the lower limit of the combustion range of the third stage combustion.

For a combustion adjustment F of the combustion part 4, the control part 5 monitors the combustion state of the first burner part 6-1 based on the combustion state information detected by the flame sensor 8 (S15). The combustion adjustment control part 12 grasps the combustion state of the entire combustion part 4 from the combustion state information of the first burner part 6-1. The combustion adjustment control part 12 performs a combustion adjustment process for the combustion part 4 based on a monitoring result of the combustion state of the combustion part 4 (S16). In this combustion adjustment process, for example, the combustion amount, the ratio of the air-fuel mixture, etc. are adjusted for conditions such as the combustion amount set in the combustion part 4.

In the combustion adjustment F of the combustion part 4, the monitoring of the combustion state (S15) and the combustion adjustment process (S16) may repeatedly be performed to adjust the combustion of the burners so as to satisfy the set conditions.

In the hot water supply process, when a change in the hot water supply request causes the combustion state in the first stage combustion or the third stage combustion, for example, the hot water supply device 2 may perform a normal combustion process and read the combustion state of the combustion part 4 for each predetermined period so as to perform the combustion adjustment process.

<Effects of First Embodiment>

According to the configuration, any of the following effects can be obtained.

(1) Regardless of the hot water supply request, the combustion state monitoring process and the combustion adjustment process can be performed for the combustion part 4 so that the combustion state of the combustion part 4 can be grasped and the combustion state can be adjusted, and therefore, the reliability of the hot water supply device 2 is enhanced.

(2) The combustion state monitoring process for the burners can be performed by using the flame sensor 8 disposed only for a portion of the burners divided into multiple groups, so that the number of parts can be reduced.

(3) Regardless of the hot water supply request, the combustion state of the combustion part 4 is regularly grasped and the state of the combustion part is improved based on the monitoring result, so that an environmental load due to the combustion exhaust generated by the combustion part can be reduced.

(4) In the combustion state monitoring process, the hot water supply temperature can be prevented from becoming lower or higher than a set temperature, and the hot water temperature can be stabilized.

Second Embodiment

Figure 4:
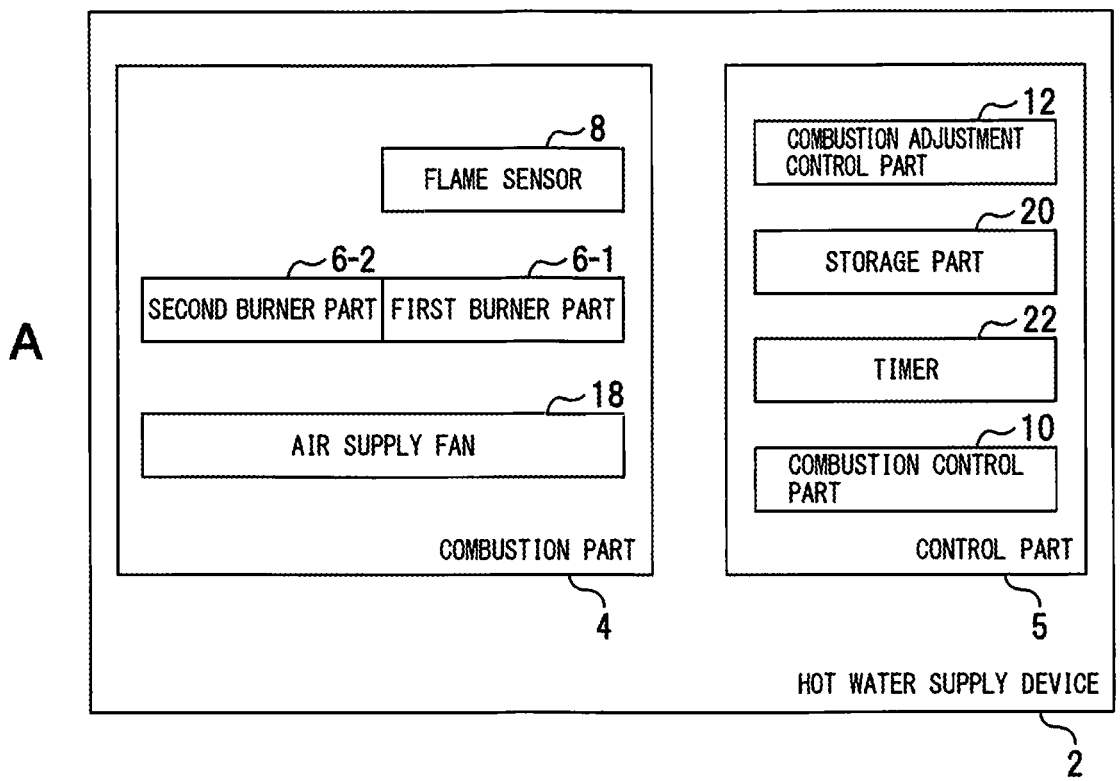
FIG. 4 is a diagram showing a configuration example of a hot water supply device according to a second embodiment.
Figure 4:
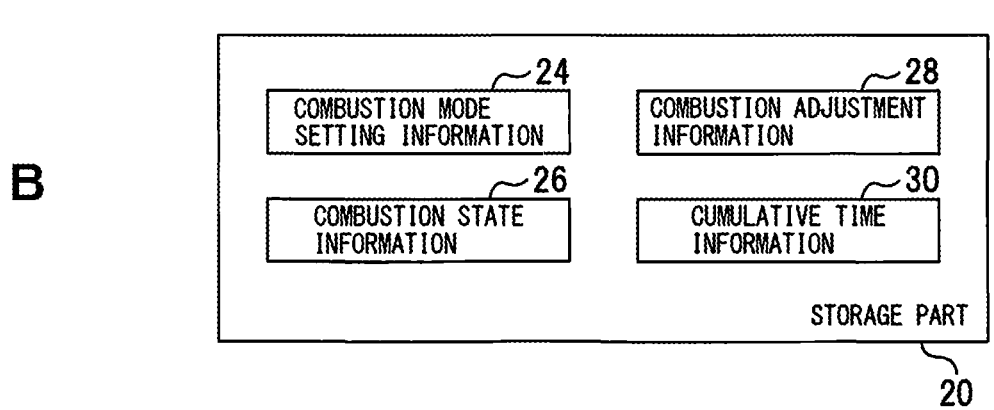

FIG. 4 shows a configuration example of a hot water supply device according to the second embodiment. The configuration shown in FIG. 4 is an example, and the present invention is not limited to this configuration. In FIG. 4, the same portions as FIG. 1 are denoted by the same reference signs.

In this hot water supply device 2, as shown in A of FIG. 4, for example, an air supply fan 18 is further included in the combustion part 4. The air supply fan 18 is an example of a means for blowing combustion air to the first burner part 6-1 and the second burner part 6-2 and is a functional part to be adjusted in the combustion adjustment process. This means that a flow of air generated by the rotation of the air supply fan 18 affects the amount and concentration of the air-fuel mixture required for combustion. Therefore, in this combustion adjustment process, for example, an amount of air in the air-fuel mixture to the burners is adjusted by increasing or decreasing the number of rotations of the air supply fan 18 based on the combustion state information.

The control part 5 further includes, for example, a storage part 20 and a timer 22.

The storage part 20 is an example of a means for storing the combustion state information etc. after performing the hot water supply process, the monitoring of the combustion part, and the combustion adjustment process.

The timer 22 is an example of a means for measuring a cumulative combustion time, a hot water supply time, etc. of the first burner part 6-1 and the second burner part 6-2. Time measurement information from the timer 22 may be stored in the storage part 20 together with the combustion state information, for example.

For example, as shown in B of FIG. 4, the storage part 20 also stores combustion mode setting information 24, combustion state information 26 detected from the flame sensor 8, combustion adjustment information 28, cumulative time information 30, etc.

The combustion mode setting information 24 is, for example, instruction information for causing the combustion part 4 performing combustion in the second combustion mode, in which the combustion state cannot be monitored, to change to the first combustion mode when a combustion monitoring condition is met. This instruction information includes, for example, increasing/decreasing the set temperature in response to a hot water supply request, adjusting a water supply amount, and other methods.

The combustion state information 26 is an example of the information detected by the flame sensor 8.

The combustion adjustment information 28 is an example of contents of adjustment processes for the burners and the air supply fan 18 based on the detected combustion state information.

The cumulative time information 30 is an example of information of cumulative time when at least the hot water supply device 2 continues in the second stage combustion (the second combustion mode) and may also include an overall hot water supply operation time.

<Hot Water Supply Operation Process>

Figure 5:
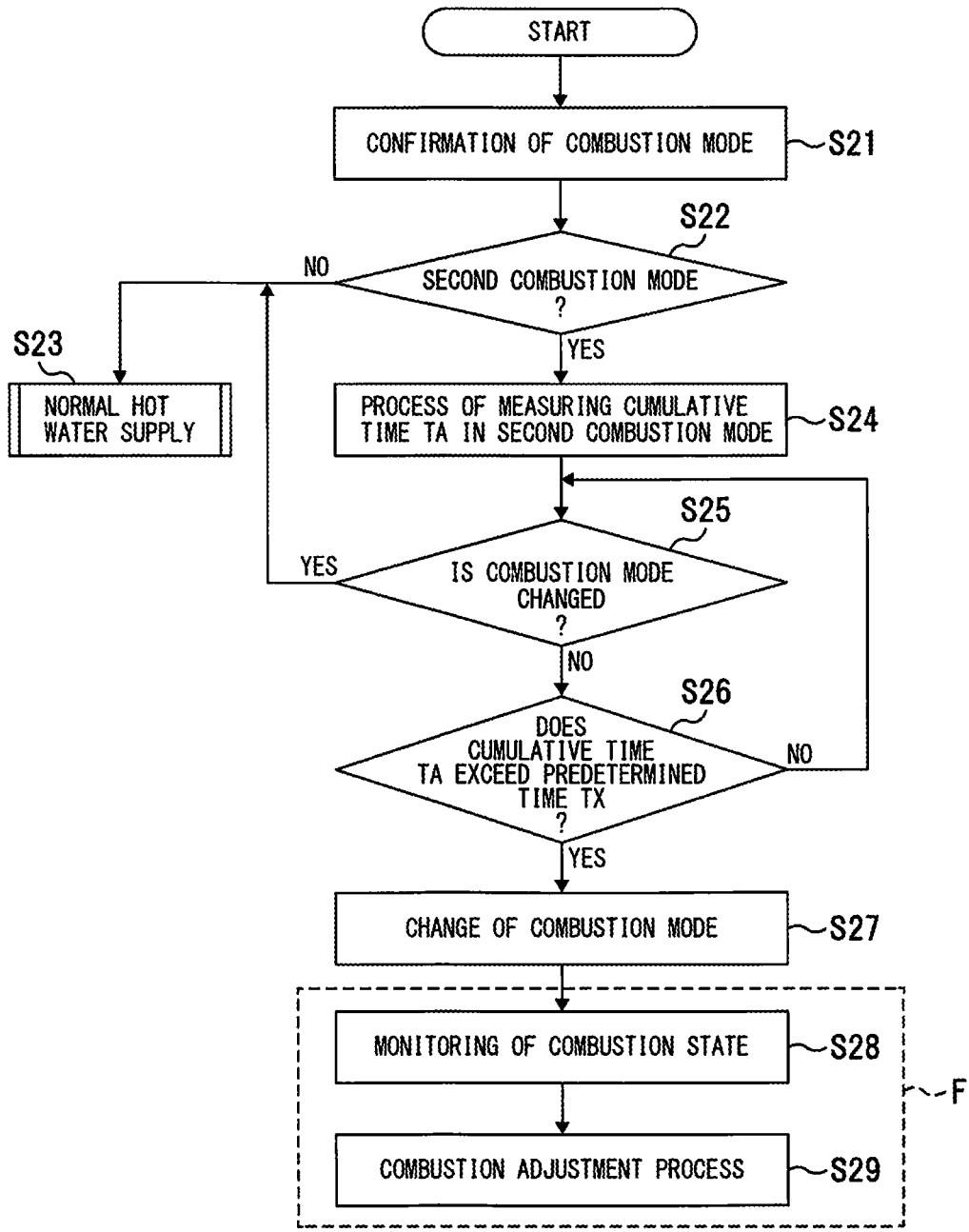
FIG. 5 is a flowchart showing an example of the hot water supply process.

FIG. 5 shows an example of a hot water supply operation process. The process procedure and process contents shown in FIG. 5 are examples, and the present invention is not limited to this configuration. This hot water supply operation process shows an example of the hot water supply program or the hot water supply method of the present invention.

For a process of monitoring the combustion part 4, the control part 5 of the hot water supply device 2 confirms the combustion mode from the set combustion stage number (S21).

The control part 5 determines whether the combustion of the combustion part 4 is in the second combustion mode in which the combustion state information cannot be detected (S22). In other words, it is determined whether the second combustion mode is set due to the second stage combustion. If the combustion is not in the second combustion mode (NO at S22), a normal hot water supply process is performed (S23).

If the combustion is in the second combustion mode (YES at S22), the timer 22 is used to perform a process of measuring a cumulative time TA in the second combustion mode (S24). The cumulative time TA measured by the timer 22 is stored in the storage part 20 as the cumulative time information 30.

The control part 5 monitors whether the combustion mode is changed (S25), and if changed (YES at S25), the control part 5 shifts to the normal hot water supply process (S23). At this point, the time measurement by the timer 22 is reset. If the second combustion mode continues (NO at S25) and the cumulative time TA exceeds, for example, 30 hours defined as a predetermined time TX YES at S26), the control part 5 shifts to a combustion mode changing process (S27). For example, the control part 5 reads out the combustion mode setting information 24 and changes a setting of the burners set to the second stage combustion to the first stage combustion or the third stage combustion. This combustion mode change control may be provided, for example, at the timing when the predetermined time TX has elapsed or may be performed at the start of the next hot water supply operation after the current hot water supply operation is terminated.

For the combustion adjustment F of the combustion part 4, the control part 5 takes in the combustion state information detected by the flame sensor 8, stores the combustion state information in the storage part 20 as the combustion state information 26 and monitors the combustion state of the first burner part 6-1 (S28). The combustion adjustment control part 12 grasps the combustion state of the entire combustion part 4 from the combustion state information of the first burner part 6-1.

The combustion adjustment control part 12 reads out the combustion adjustment information 28, for example, and adjusts the functional parts such as the air supply fan 18 (S29).

In the combustion adjustment F of the combustion part 4, the monitoring of the combustion state (S28) and the combustion adjustment process (S29) may repeatedly be performed to adjust the combustion of the burners so as to satisfy the set conditions.

When the hot water supply device 2 is operating for water supply in the first combustion mode in which the combustion state can be monitored, for the normal hot water supply process, the combustion adjustment F may be performed every constant cumulative combustion time, for example.

<Effects of Second Embodiment>

According to the configuration, any of the following effects can be obtained.
  (1) Even when hot water is supplied to a hot water supply load with little variation in hot water supply requests, the monitoring of the combustion state and the combustion adjustment process can regularly be performed, so that the reliability and safety of the hot water supply device can be improved.
  (2) Since the timer 22 is used for monitoring the cumulative time TA of the state in which the combustion state information cannot be detected by the flame sensor 8, the monitoring of the combustion state and the shift to the combustion adjustment process are performed in accordance with the time of use of the burners even if hot water is intermittently supplied, so that the safety of the hot water supply device 2 can be improved.
  (3) In the burners having the combustion capacity adjusted by combining the burners divided into groups of multiple burners, the monitoring of the combustion state and the combustion adjustment processing can be performed without disposing flame sensors for all burner parts, so that the number of parts can be reduced to contribute to cost saving.

EXAMPLE 1

<Hot Water Supply Device 40>

Figure 6:
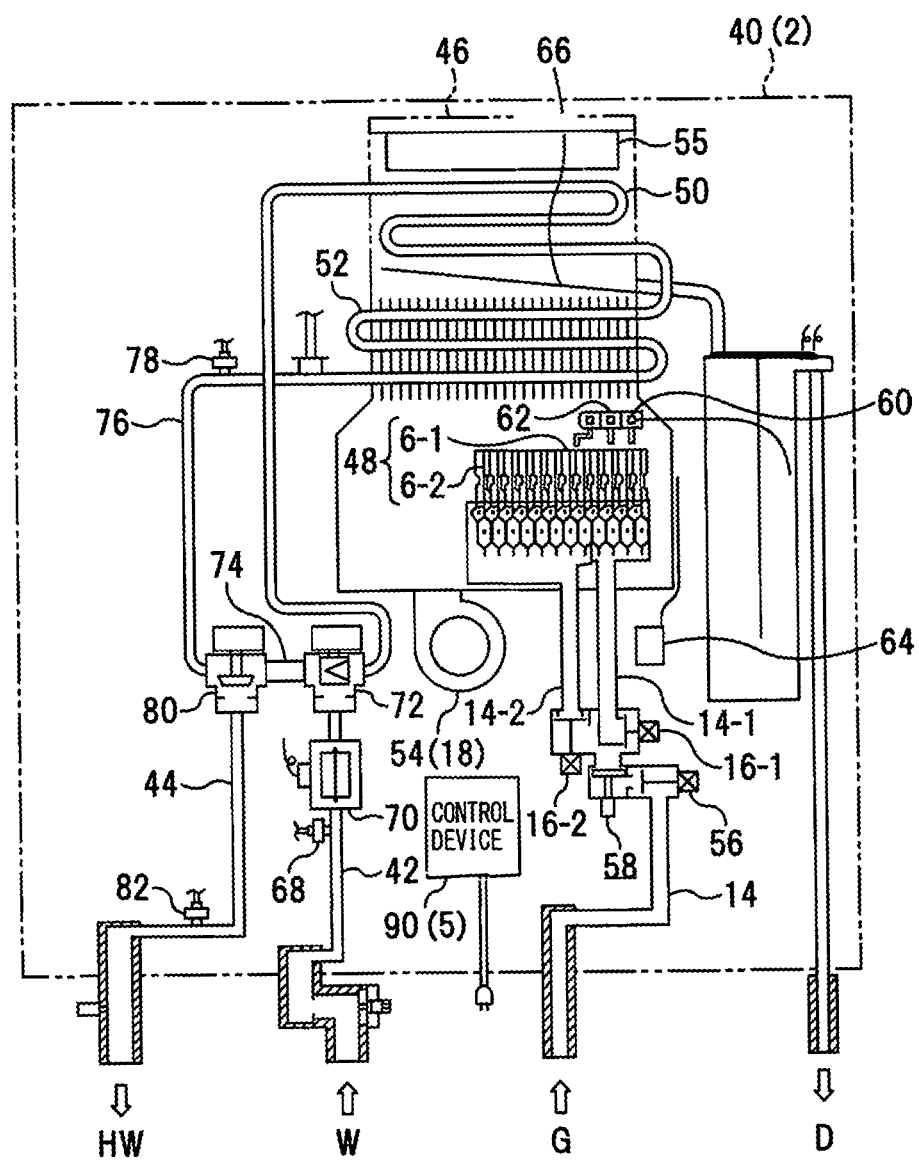
FIG. 6 is a diagram showing a configuration example of the hot water supply device according to Example 1.

FIG. 6 shows a hot water supply device 40 according to Example 1. In FIG. 6, the same portions as FIGS. 1 and 4 are denoted by the same reference signs.

For example, as shown in FIG. 6, the hot water supply device 40 includes the connected gas supply pipes 14-1, 14-2 supplying the fuel gas G, a connected water supply pipe 42 taking in supplied water W, and a connected hot water supply pipe 44 discharging heated hot water HW. The hot water supply device 40 combusts the fuel gas G taken in through the gas supply pipes 14-1, 14-2 to generate the combustion exhaust. The hot water supply device 40 causes low-temperature supplied water W taken in from the water supply pipe 42 to exchange heat with the combustion exhaust to generate hot water HW and discharges the hot water HW from the hot water supply pipe 44.

The hot water supply device 40 includes a burner 48 and heat exchangers 50, 52 disposed in a combustion chamber 46, for example. Combustion air is taken into the combustion chamber 46 by an air supply fan 54. The fuel gas G is supplied from the gas supply pipes 14-1, 14-2 to the burner 48. The gas supply pipes 14-1, 14-2 are equipped with a main gas electromagnetic valve 56 allowing or blocking the passage of the fuel gas G and a hot water supply gas proportional valve 58 controlling an inflow of gas toward the burner 48. The burner 48 includes the multiple burner parts 6-1, 6-2, and the supply of the fuel gas G to the burner parts 6-1, 6-2 is switched by switching valves 16-1, 16-2. The combustion exhaust generated by the combustion of the burner 48 is discharged to the outside of the combustion chamber 46 from an exhaust port 55 of the combustion chamber 46.

A spark plug 60 and a flame rod 62 are disposed near gas ejection holes of the burner part 6-1 in the combustion chamber 46. The spark plug 60 is connected to an igniter 64 disposed outside the combustion chamber 46, for example, and ignites the burner part 6-1. For example, after the burner part 6-1 is ignited, the burner 48 ignites the burner part 6-2 by using the flame on the burner part 6-1.

The flame rod 62 is an example of a flame sensor used for monitoring the combustion state of the burner part 6-1 and adjusting the combustion.

The combustion chamber 46 may further be equipped with a flame rod detecting only the ignition state of the burner parts 6-1, 6-2, for example.

The heat exchanger 50 is disposed downstream of an exhaust path through which the combustion exhaust flows in the combustion chamber 46 and is an example of a secondary heat exchanger mainly recovering the latent heat of the combustion exhaust by exchanging heat with the low-temperature supplied water W.

The heat exchanger 52 is disposed upstream of the exhaust path and is an example of a primary heat exchanger mainly recovering the sensible heat of the combustion exhaust by exchanging heat with the supplied water W with which heat has been exchanged in the heat exchanger 50.

The water supply pipe 42 allowing the supplied water W to flow is equipped with a temperature sensor 68, a water amount sensor 70, and a water control valve 72 for mixing, for example. The temperature sensor 68 detects a water supply temperature. The water amount sensor 70 detects an amount of the supplied water W corresponding to the hot water supply. The water control valve 72 for mixing adjusts supply of the supplied water W flowing through a bypass pipe 74 to control a mixed amount of the supplied water W relative to the hot water HW.

The heat exchangers 50, 52 are connected in series, and the hot water HW from the heat exchanger 52 flows into a hot water discharge pipe 76. A temperature sensor 78 and a water control valve 80 are disposed on the hot water discharge pipe 76. The temperature sensor 78 detects a discharged hot water temperature of the hot water HW flowing on an outlet side of the heat exchanger 52. The water control valve 80 is opened and closed to regulate whether hot water is supplied and is also used as a mixing chamber for mixing the supplied water W through the bypass pipe 74 and the hot water HW. A temperature sensor 82 disposed on the hot water supply pipe 44 is a means for detecting the temperature of the hot water HW discharged from the hot water supply device 40 and detects the temperature of the hot water HW mixed with the supplied water W by the water control valve 80.

The hot water supply device 40 controls the intake of the supplied water W and the discharge of the hot water HW with opening and closing of the water control valve 80. Specifically, when the hot water supply device 40 puts the water control valve 80 into an opened state so that the supplied water W can flow in, the supplied water W flows into the water supply pipe 42 due to a water pressure from a water supply source.

The hot water supply device 40 includes a control device 90 setting a hot water supply amount and a combustion amount in accordance with the hot water supply request, monitoring the combustion state of the burner parts 6-1, 6-2, and controlling the combustion adjustment process. For example, when the water supply amount is detected by the water amount sensor 70, the control device 90 automatically starts the combustion control in accordance with a flow rate of the supplied water.

The combustion chamber 46 is further equipped with a drain receiver 66 for accumulating a drainage water D generated due to the heat exchange of the heat exchanger 50. The drainage water D is guided from the drain receiver 66 through a drain pipe to a drain tank. When the drainage water D in the drain tank exceeds a predetermined level, the drainage water D is discharged from the drain tank through a discharge pipe to the outside of the hot water supply device 40.

<Control Device 90>

Figure 7:
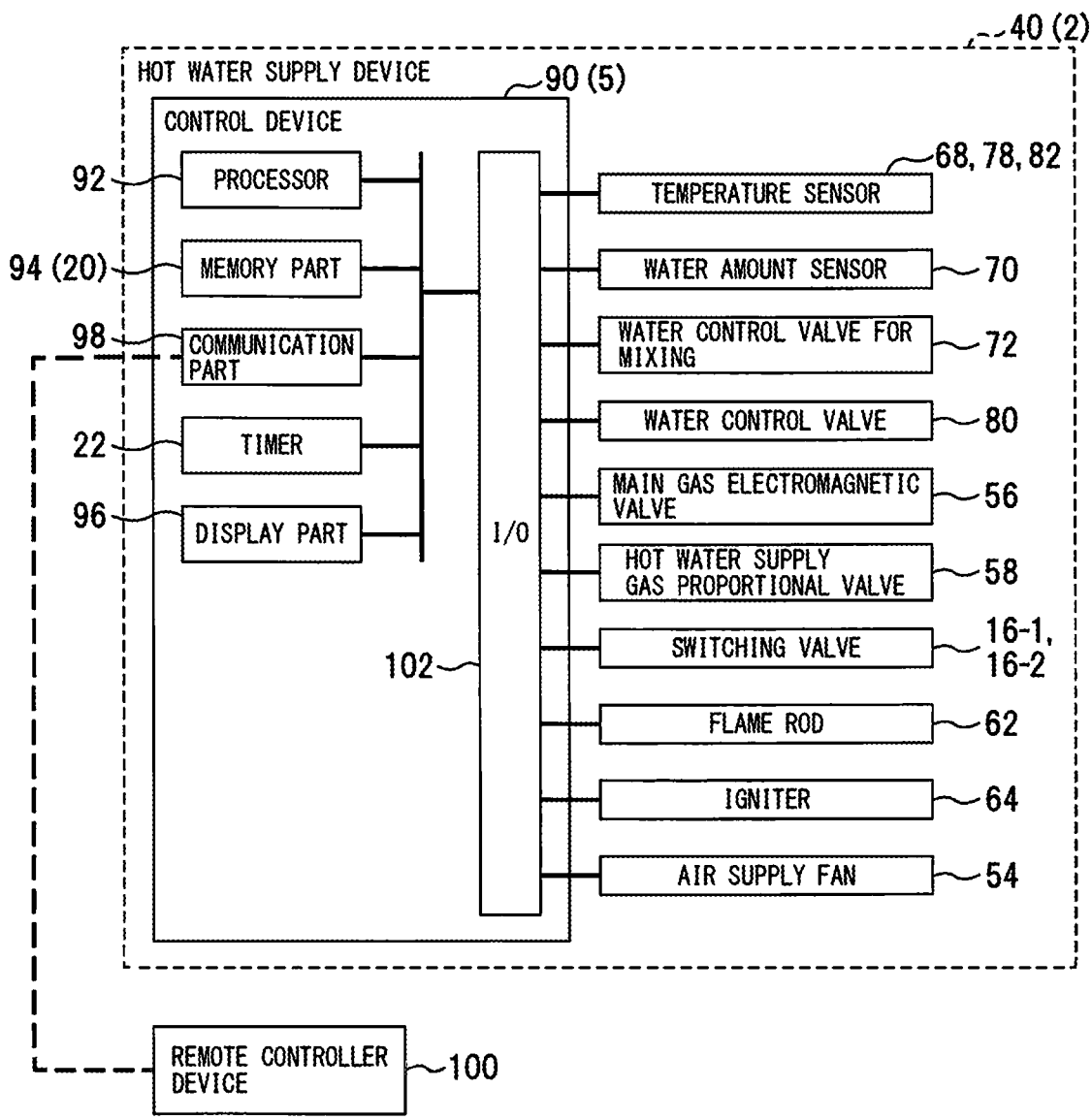
FIG. 7 is a diagram showing a configuration example of a control device.

FIG. 7 shows a configuration example of the control device.

The control device 90 is made up of a computer and includes, for example, as shown in FIG. 7, a processor 92, a memory part 94, a display part 96, a timer 22, a communication part 98 communicating with an external remote controller device 100, and an input/output part (I/O) 102.

The processor 92 executes a program in the memory part 94, for example, and performs information processing such as the hot water supply control of the hot water supply device 40, the combustion control of the burner parts 6-1, 6-2, the monitoring of the combustion state, and the combustion adjustment process.

The memory part 94 is a storage means storing programs for the hot water supply control and the combustion state monitoring process, storing the detected combustion state information, etc. and includes storage elements such as a ROM (Read-Only Memory), a RAM (Random-Access Memory), and an EEPROM (Electrically Erasable Programmable Read-Only Memory).

The programs of the combustion state monitoring process etc. are not limited to those stored in the memory part 94 and may be stored in a recording medium or an external database from which the programs can be read out when the combustion state monitoring process is performed.

The display part 96 is an example of a means for displaying set temperature information that is a hot water supply request and also displaying process contents and notification information during execution of the monitoring of the combustion state, the combustion adjustment process, etc. For the display part 96, for example, an LCD (Liquid Crystal Display) is used.

The timer 22 is an example of a means for measuring the combustion time of the second combustion mode in the combustion state monitoring process. For the timer 22, for example, a hardware clock mounted on a control board may be used, or a software clock implemented for measuring time by a control program such as OS (Operating System) may be used.

The communication part 98 communicates with the remote controller device 100 under the control of the processor 92 and exchanges information necessary for the hot water supply control etc., results of monitoring of the combustion state of the burners, and other information such as the combustion improvement process of the burners.

The I/O 102 is an interface connecting to the functional parts of the hot water supply device 40. In the control device 90, detection signals are taken in via the I/O 102 from sensors such as the temperature sensors 68, 78, 82 and the water amount sensor 70, and control signals are output from the I/O 102 to the water control valve 72 for mixing, the water control valve 80, and combustion system functional parts such as the main gas electromagnetic valve 56, the hot water supply gas proportional valve 58, the switching valves 16-1, 16-2, the flame rod 62, the igniter 64, and the air supply fan 54.

<Monitoring of Combustion State>

Figure 8:
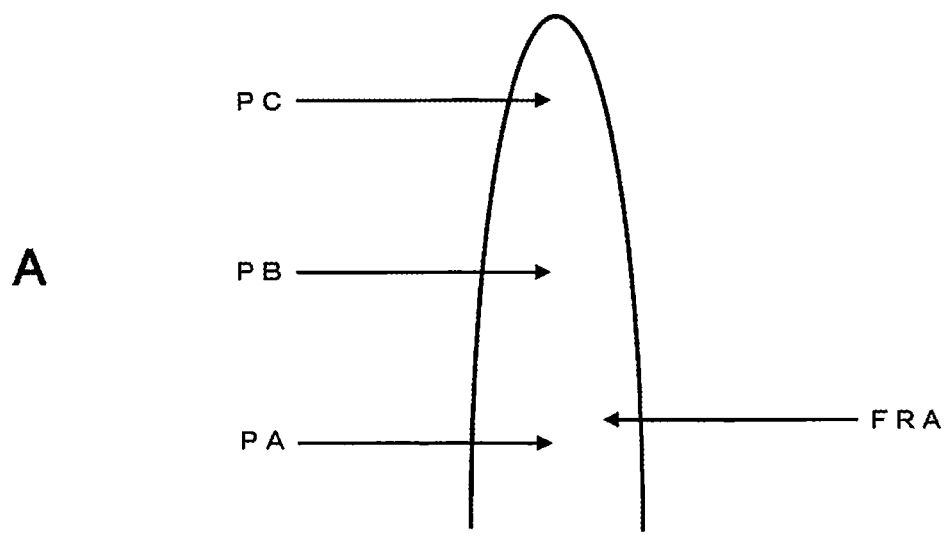
FIG. 8 is a diagram showing an example of a combustion state monitoring process with a flame rod.
Figure 8:
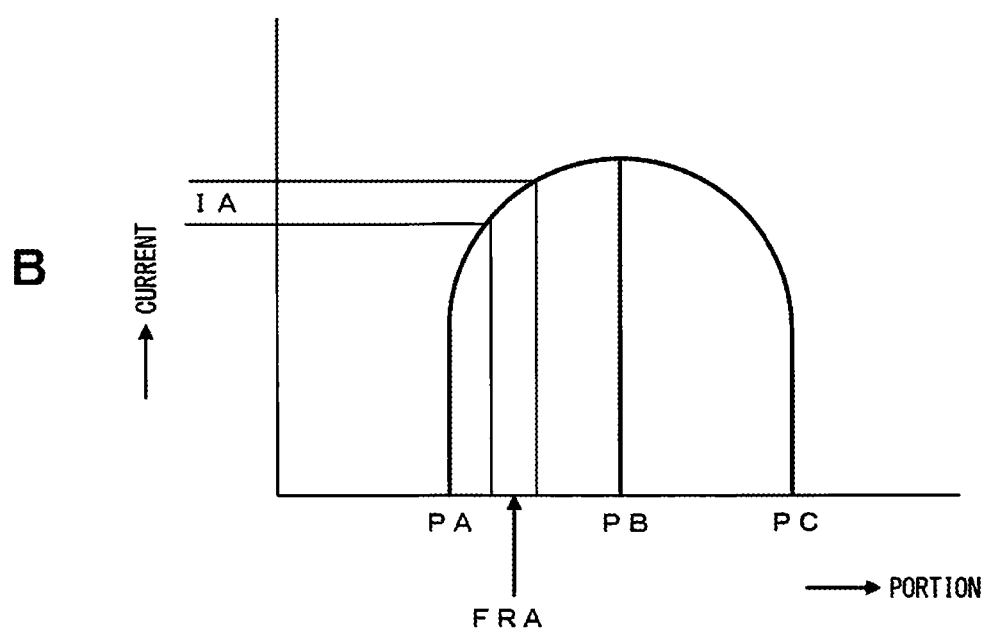

FIG. 8 shows an example of the combustion state monitoring process.

The flame rod 62 is an example of a flame sensor brought into contact with, for example, a flame during combustion so as to detect the combustion state information changing in accordance with the state of the flame. "FRA" in A of FIG. 8 showing a shape of a flame during combustion is a portion where the flame rod 62 is in contact with the flame. The flame rod 62 detects a flame current value as the combustion state information changing in accordance with the height of the flame.

B of FIG. 8 shows a relationship between the flame portion during combustion and the current value. The detected flame current value is maximized near a central part of the flame (PB), and the flame current value decreases at positions of PA closer to the burner than the PB in height and PC closer to the tip of the flame. In other words, the current value decreases with distance from the central part of the flame. This means that the flame rod 62 has a fixed arrangement position and therefore can monitor a change in shape of the flame corresponding to the combustion state of the burner through a change in the current value. Specifically, as the flame becomes smaller and the PB comes closer to the FRA, the current value increases. As the flame becomes larger and the PB moves away from the FRA, the current value decreases.

The control device 90 improves the combustion of the burners 48 by using the relationship between the detected current value and the shape change of the flame. In this combustion improvement process, for example, the number of rotations of the air supply fan 54 sending air to the burners 48 is adjusted.

For example, the control device 90 provides controls to increase the number of rotations of the air supply fan 54 when the current value detected by using the flame rod 62 is larger than an ideal value and decrease the number of rotations of the air supply fan 54 when the current value is smaller than the ideal value.

An ideal shape of the flame changes depending on the combustion amount (the combustion stage number and the current value of the hot water supply gas proportional valve 58), and the ideal value of the current value detected by the flame rod 62 also changes. Therefore, by preparing data of the ideal current value in advance for the combustion stage number and the current value of the hot water supply gas proportional valve 58 and by detecting a state of the present current value relative to the ideal value so as to correct the fan rotation number, the shape of the flame can be controlled to the ideal state.

<Execution Timing of Monitoring Process>

Figure 9:
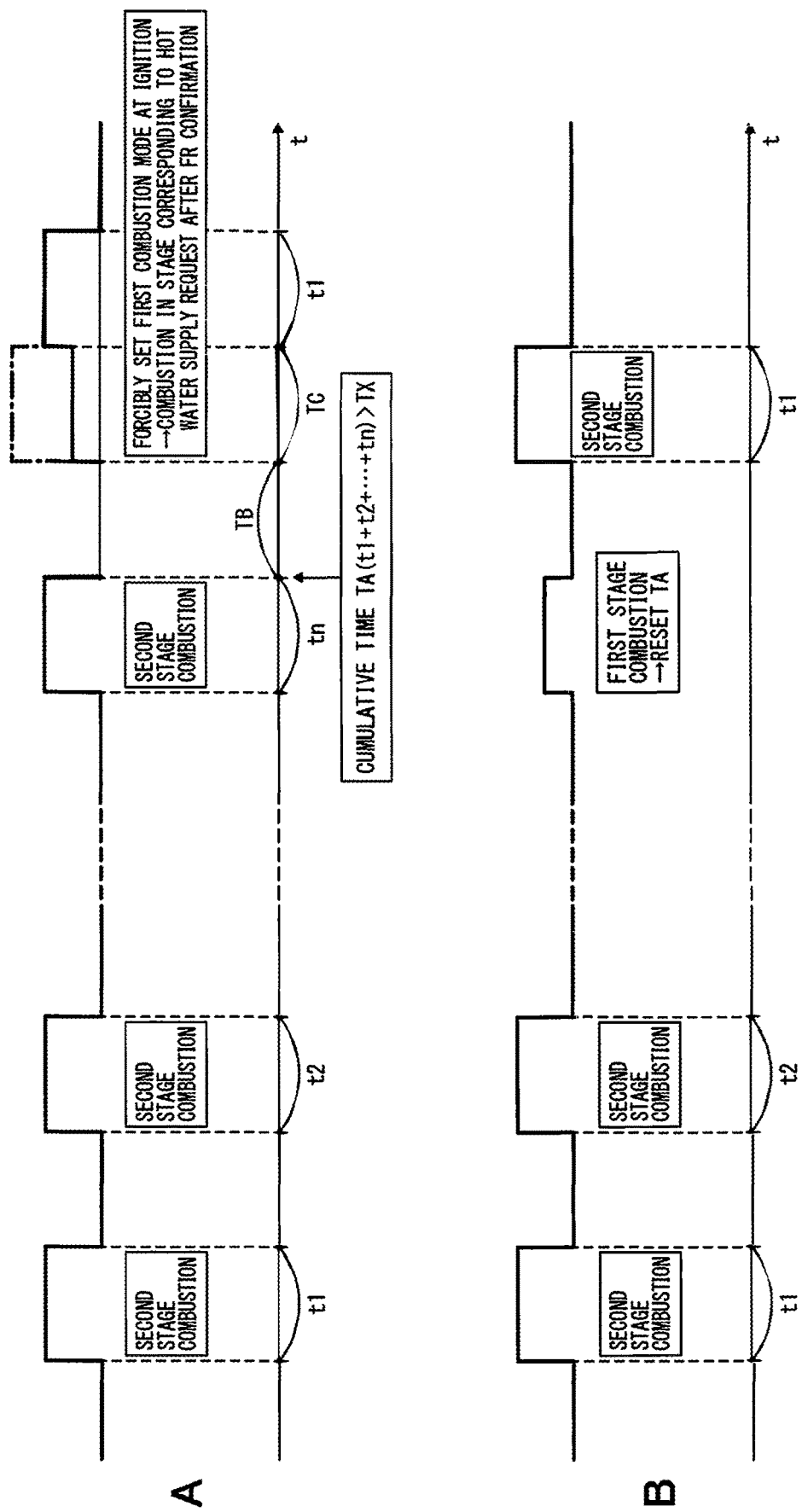
FIG. 9 is a diagram showing an example of a timing of the combustion state monitoring process.

FIG. 9 shows an example of the timing of execution of the combustion state monitoring process. The process contents and the process timing shown in FIG. 9 are examples.

For example, as shown in A of FIG. 9, when the hot water supply process in the second stage combustion continues intermittently, the control device 90 uses the timer 22 to measure respective combustion times t1, t2, . . . , tn. The hot water supply device 40 accumulates and stores the measured combustion time in the memory part 94, and when the cumulative time TA exceeds a predetermined time TX, for example, 30 hours, a process mode for combustion state monitoring is set. At the start of the next hot water supply operation, the hot water supply device 40 forces combustion in the first combustion mode (first stage combustion or third stage combustion) for a certain time TC, for example, 10 [seconds], regardless of the hot water supply request for the combustion state monitoring process and then performs the combustion in the stage corresponding to the hot water supply request.

Additionally, for example, the control device 90 may measure an elapsed time TB until the start of the next hot water supply operation after the cumulative time TA exceeds the predetermined time TX and may set the combustion capacity at the time of the next hot water supply operation in accordance with the length of the elapsed time TB.

For example, as shown in B of FIG. 9, when the hot water supply request is changed after continuation of the hot water supply process in the second stage combustion so that the burners 48 are changed to the first stage combustion, the control device 90 resets the cumulative time TA stored in the memory part 94. When the second stage combustion is performed next time, the control device 90 newly measures and stores the combustion time of the second stage combustion as the cumulative time TA. The hot water supply device 40 may monitor the combustion state by using the flame rod 62 when the burners 48 are changed to the first stage combustion and may adjust the combustion in accordance with the combustion state.

<Hot Water Supply Operation Process>

Figure 10:
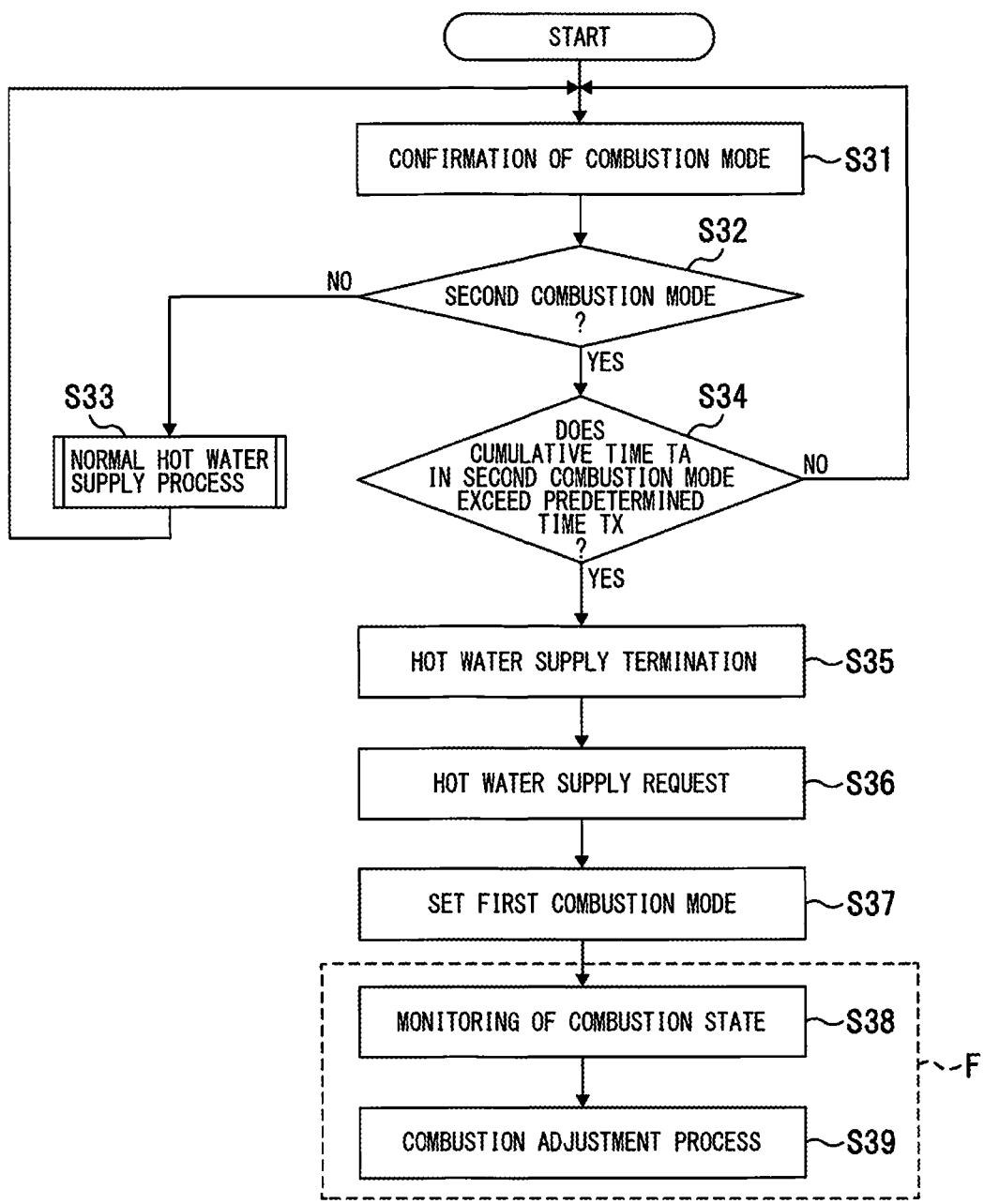
FIG. 10 is a flowchart showing an example of the hot water supply process.

FIG. 10 shows an example of a hot water supply operation process. The process procedure and process contents shown in FIG. 10 are examples, and the present invention is not limited to this configuration. This hot water supply operation process shows an example of the hot water supply program or hot water supply method of the present invention.

The control device 90 performs the process of monitoring the combustion part 4 and monitors that the hot water supply process is performed in the second combustion mode. At steps S31 to S34, the same processes as steps S21 to S23 and step S26 of FIG. 5 may be performed.

After the cumulative time TA exceeds the predetermined time TX, the hot water supply device 40 performs the hot water supply process in accordance with the continuing hot water supply request and terminates the hot water supply process when the hot water supply request no longer exists (S35). When the next hot water supply request (S36) is generated, the hot water supply device 40 causes the burners 48 to perform the first stage combustion (S37) so as to achieve the first combustion mode regardless of the content of this hot water supply request and performs the monitoring of the combustion state (S38) and the combustion adjustment process (S39).

<Combustion Improvement Process>

Figure 11:
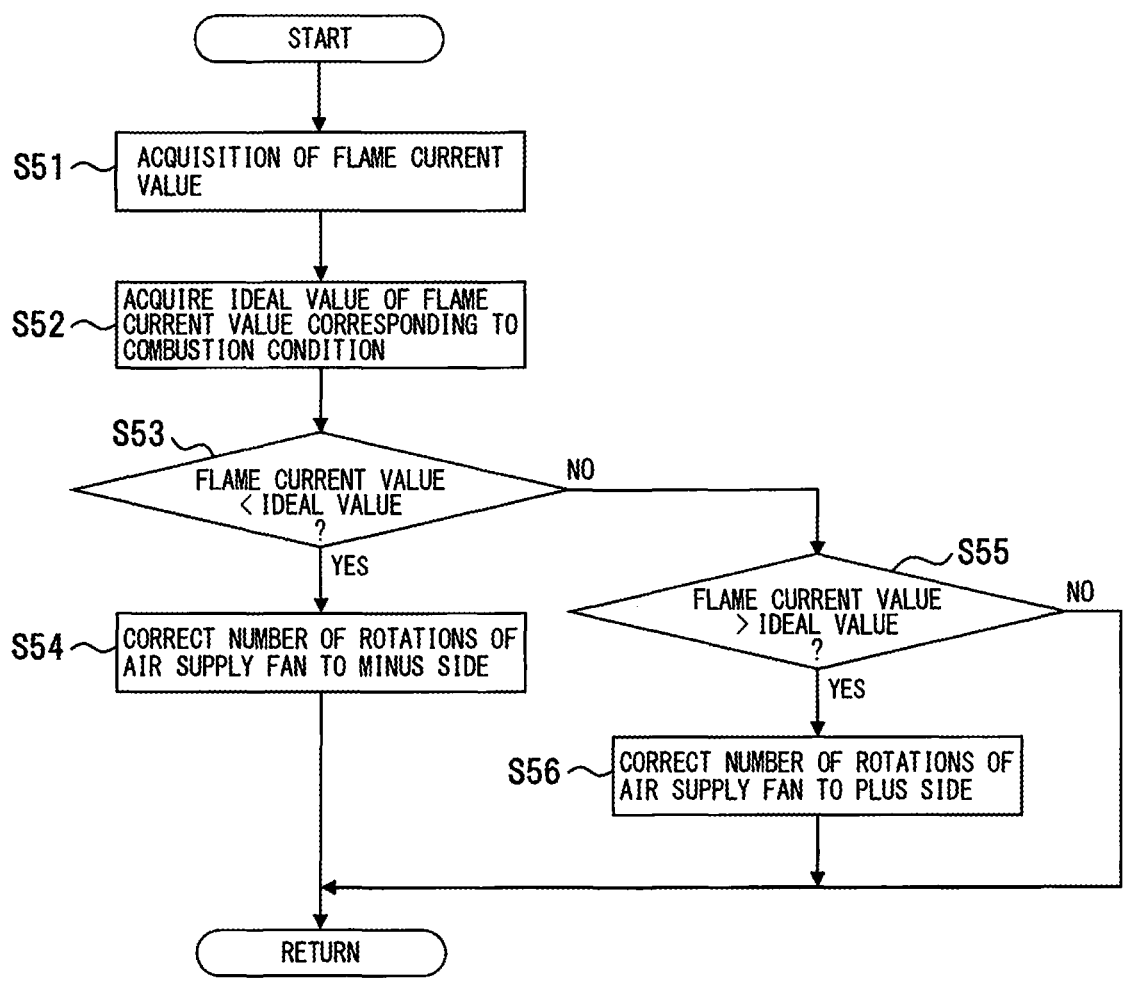
FIG. 11 is a flowchart showing an example of a combustion improvement processing.

FIG. 11 shows an example of a combustion improvement process. The process contents and process procedure shown in FIG. 11 are examples, and the present invention is not limited to this configuration.

This combustion improvement process is an example of the adjustment process of the combustion part 4 and, for example, an air supply amount is adjusted based on a combustion state monitoring result.

The control device 90 acquires the flame current value detected by the flame rod 62 (S51) and acquires the ideal value of the flame current value corresponding to the combustion conditions of the combustion part 4 (S52). The ideal value of the flame current value is information of the ideal amount of air supply by the air supply fan 54 or the number of rotations thereof and may be stored in the memory part 94 of the hot water supply device 40 or may be acquired from an external database etc. by a communication means.

If the control device 90 determines that the flame current value is less than the ideal value (YES at S53), the control device 90 corrects the number of rotations of the air supply fan 54 to the minus side (S54).

If the flame current value is not less than the ideal value (NO at S53), the control device 90 determines whether the flame current value is larger than the ideal value (S55). If the flame current value is larger than the ideal value (YES at S55), the control device 90 corrects the number of rotations of the air supply fan 54 to the plus side (S56).

If the flame current value is not larger than the ideal value (NO at S55), the control device 90 determines that the combustion state of the burners 48 is the ideal state and maintains the number of rotations of the air supply fan 54.

The adjustment amount of the rotation number of the air supply fan 54 is set in accordance with conditions such as a type and a size of the hot water supply device 40, a number of a hot water supply capacity, and safety regulation standards for the hot water supply device.

<Effects of Example 1>

According to Example 1, any of the following effects can be obtained.

(1) Even if the hot water supply operation continues such that only the second burner part 6-2 without the flame rod 62 performs combustion, the monitoring of the combustion state and the combustion adjustment process can be performed.
(2) Since the combustion state of the burners 48 can be monitored and adjusted regardless of the combustion mode, the safety of the hot water supply device can be ensured, and the reliability can be improved.
(3) The combustion part 4 divided into the multiple burner parts 6-1, 6-2 does not need to include the flame rod 62 for each of the burner parts 6-1, 6-2, so that the cost can be reduced by cutting down the number of parts.
(4) The monitoring of the combustion state and the adjustment of the combustion part 4 can regularly be performed, and the incomplete combustion of the burners 48 or the combustion in a state of excessive fuel gas can be avoided, so that the environmental load can be reduced.
(5) By causing the burners 48 to perform combustion in the first combustion mode to monitor and adjust the combustion state, the high-temperature hot water HW can be prevented from being discharged due to a combustion capacity exceeding the hot water supply request, and the safety is enhanced for the user of the hot water supply device.
(6) By causing the burners 48 to perform combustion in the first stage combustion or the third stage combustion to monitor and adjust the combustion state and thereby covering the second stage combustion portion to prevent the high-temperature hot water HW or the low-temperature hot water HW from being discharged by a combustion capacity satisfying the hot water supply request, a temperature change can be prevented during hot water supply, so that the convenience for the user of the hot water supply device 40 is enhanced.

EXAMPLE 2

Figure 12:
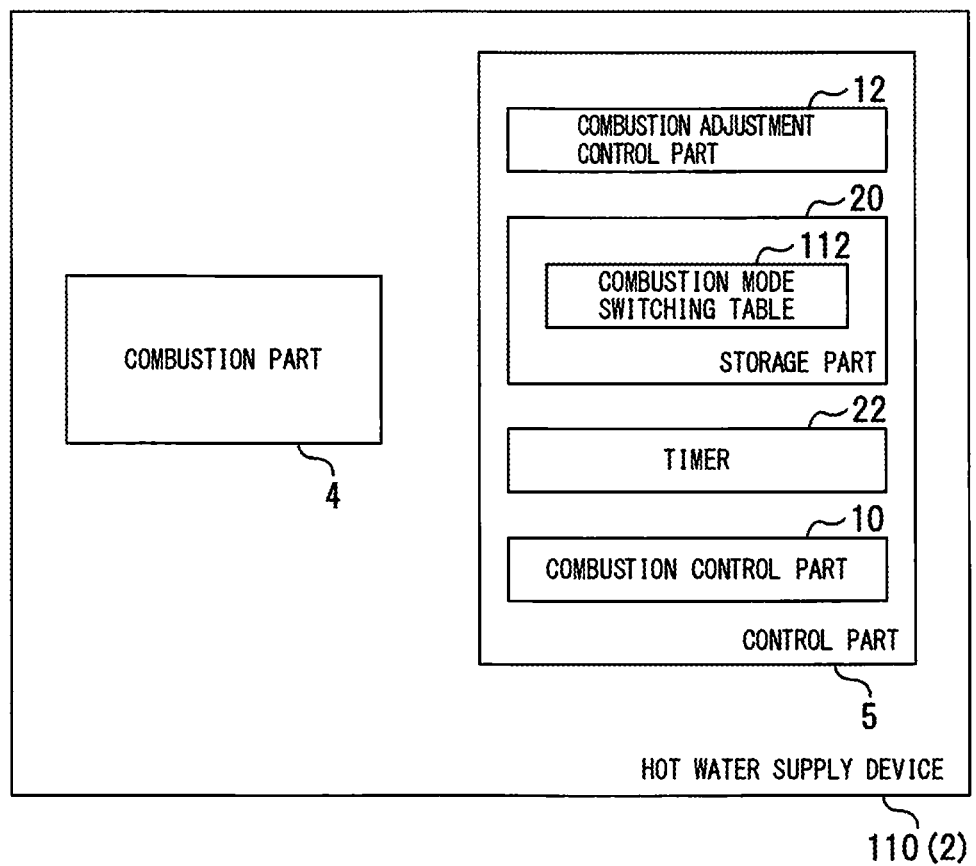
FIG. 12 is a diagram showing a configuration example of a hot water supply device according to Example 2.

<Hot Water Supply Device 110>
FIG. 12 shows a hot water supply device 110 according to Example 2. In FIG. 12, the same portions as FIGS. 1 and 4 are denoted by the same reference signs.

For the monitoring of the combustion state and the adjustment process of the combustion part 4 when only the second burner part 6-2 without the flame rod 62 performs combustion, this hot water supply device 110 performs a process of increasing the number of burners that can perform combustion when the cumulative time TA of the burner combustion exceeds the predetermined time TX. For example, as shown in FIG. 12, the hot water supply device 110 includes the combustion part 4 and the control part 5, and a combustion mode switching table 112 is stored in the storage part 20.

<Combustion Mode Switching Table 112>
This combustion mode switching table 112 is an example of limit threshold value information when the burners 48 during the second stage combustion are forcibly changed to the third stage combustion. As to the hot water supply device 110, the number of hot water supply capacity is determined by the heat energy obtained by the combustion of the burners 48. The burners 48 has a hot water supply capacity of [Nos.] 6 to 16 at the time of the second stage combustion, for example. The hot water supply capacity of [No.] 1 is the combustion amount raising 1 [L] of water by 25 [(° C.)] in 1 [minute], and the combustion amount per hour [h] of [No.] 1 is 1500 [Kilo calories/h]. When the set temperature of the hot water supply is increased so as to increase the combustion stage number of the burners 48 during combustion, the flow rate of suppliable hot water is reduced.

For the burners 48 of the hot water supply device 110, an ignition flow rate indicative of a minimum flow rate is defined so as to prevent excessive combustion and prevent boiling of water in the heat exchangers 50, 52, for example. Therefore, if the set temperature is excessively increased in the combustion part 4, the flow rate becomes lower than the ignition flow rate for combustion in both the first burner part 6-1 and the second burner part 6-2, and this may make it impossible to increase the combustion stage number.

Therefore, for example, as shown in FIG. 13, the combustion mode switching table 112 stores a flow amount of suppliable hot water when a set temperature (T$\beta$1, T$\beta$2, . . . , T$\beta$18) is set with respect to an inflow water temperature (T$\alpha$1, T$\alpha$2, . . . , T$\alpha$11) in the combustion amount at the time of the second stage combustion. Additionally, the combustion mode switching table 112 includes a limit threshold value P set to indicate a boundary between a hot water supply flow rate LX at which switching to the third stage combustion can be performed and a hot water supply flow rate LY at which the switching cannot be performed. This limit threshold value P varies depending on, for example, a defined value of the ignition flow rate of the hot water supply device 110. Specifically, when the ignition flow rate is small, the switching to the third stage combustion can be performed even if the flow rate is small, and when the ignition flow rate is large, the switching to the third stage combustion cannot be performed, so that the set temperature can be raised in a narrower range.

In the monitoring of the combustion state and the combustion adjustment process when the second stage combustion continues, the hot water supply device 110 changes the combustion stage number while using the limit threshold value P of the combustion mode switching table 112.

Figure 14:
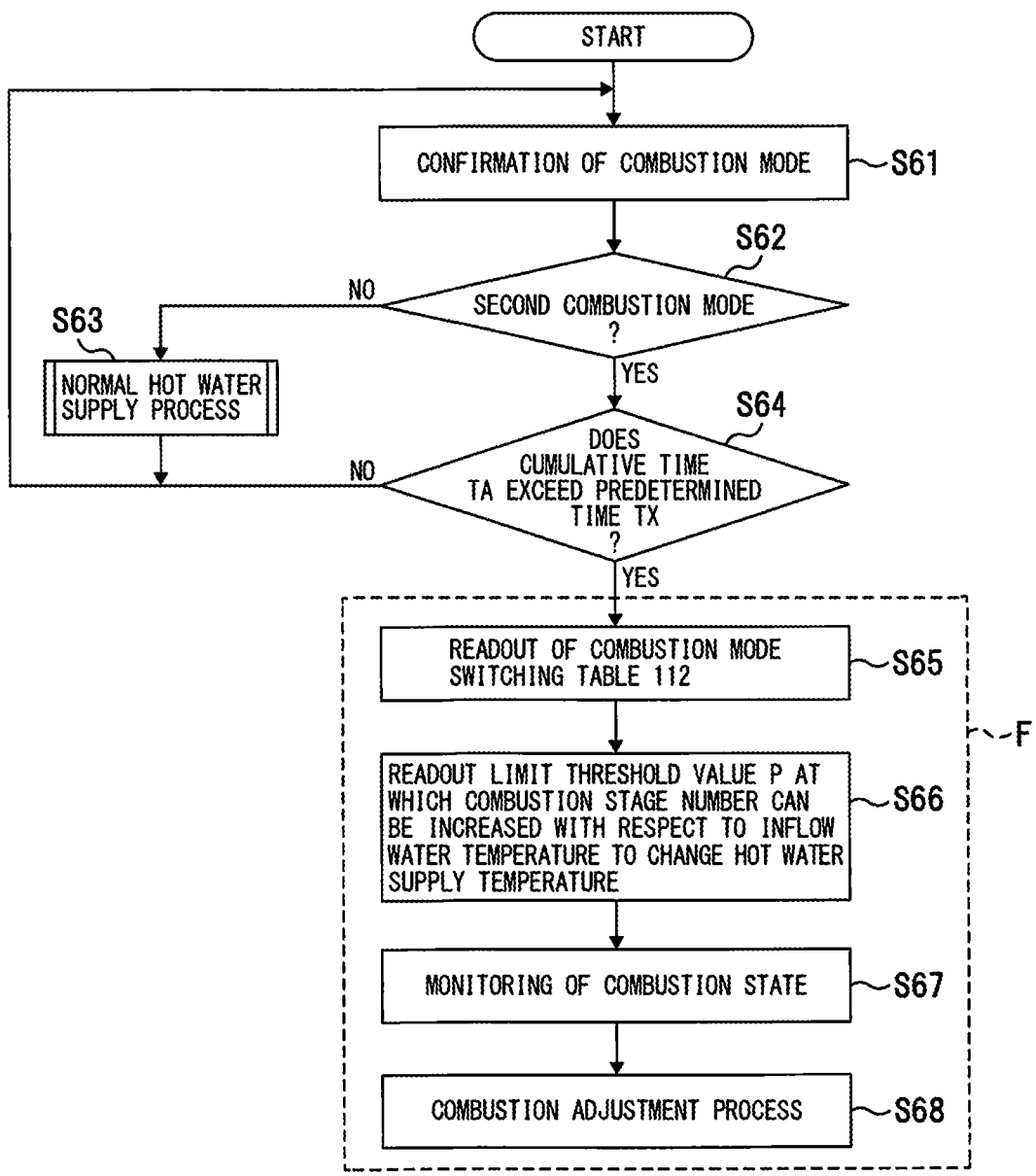
FIG. 14 is a flowchart showing an example of the hot water supply process.

<Hot Water Supply Operation Process>
FIG. 14 shows an example of a hot water supply operation process. The process procedure and process contents shown in FIG. 14 are examples, and the present invention is not limited to this configuration. This hot water supply operation process shows an example of the hot water supply program or hot water supply method of the present invention.

The hot water supply device 110 performs the process of monitoring the combustion part 4 and monitors that the hot water supply process is performed in the second combustion mode. At steps S61 to S64, the same processes as steps S21 to S23 and step S26 of FIG. 5 may be performed.

Subsequently, for the combustion adjustment F including a change of the combustion stage number and the monitoring of the combustion state, the hot water supply device 110 reads out the combustion mode switching table 112 in the storage part 20 (S65) and reads out the limit threshold value P at which the combustion stage number can be increased with respect to the inflow water temperature so as to change the hot water supply temperature (S66). The set temperature may be selected as a temperature within a range in which the flow rate is larger than the limit threshold value P and at which the burner 48 performs the third stage combustion.

After the third stage combustion is achieved, the hot water supply device 110 monitors the combustion state by using the detection information of the flame rod 62 (S67) and performs the combustion adjustment process based on the monitoring result (S68).

For example, when the combustion stage number is increased during hot water supply, the hot water supply device 110 may display a notice of temperature change on the display part of the control device 90 or the remote controller device 100 or may give a voice notification.

For example, when the set temperature is changed and the ignition of the third stage combustion is confirmed, the hot water supply device 110 may forcibly increase the amount of water supplied from the water supply pipe 42.

<Effects of Example 2>

According to Example 2, any of the following effects can be obtained.
 (1) Since the monitoring of the combustion state of the burners 48 and the improvement process of the combustion part 4 can regularly be performed, the reliability and safety of the hot water supply device can be enhanced.
 (2) Even when the burners 48 perform combustion with a large combustion amount in response to a hot water supply request, the combustion state of the burners 48 can be monitored without reducing the combustion amount.
 (3) The hot water supply temperature can be prevented from dropping in the combustion state monitoring process.

EXAMPLE 3

<Hot Water Supply Process>

Figure 15:
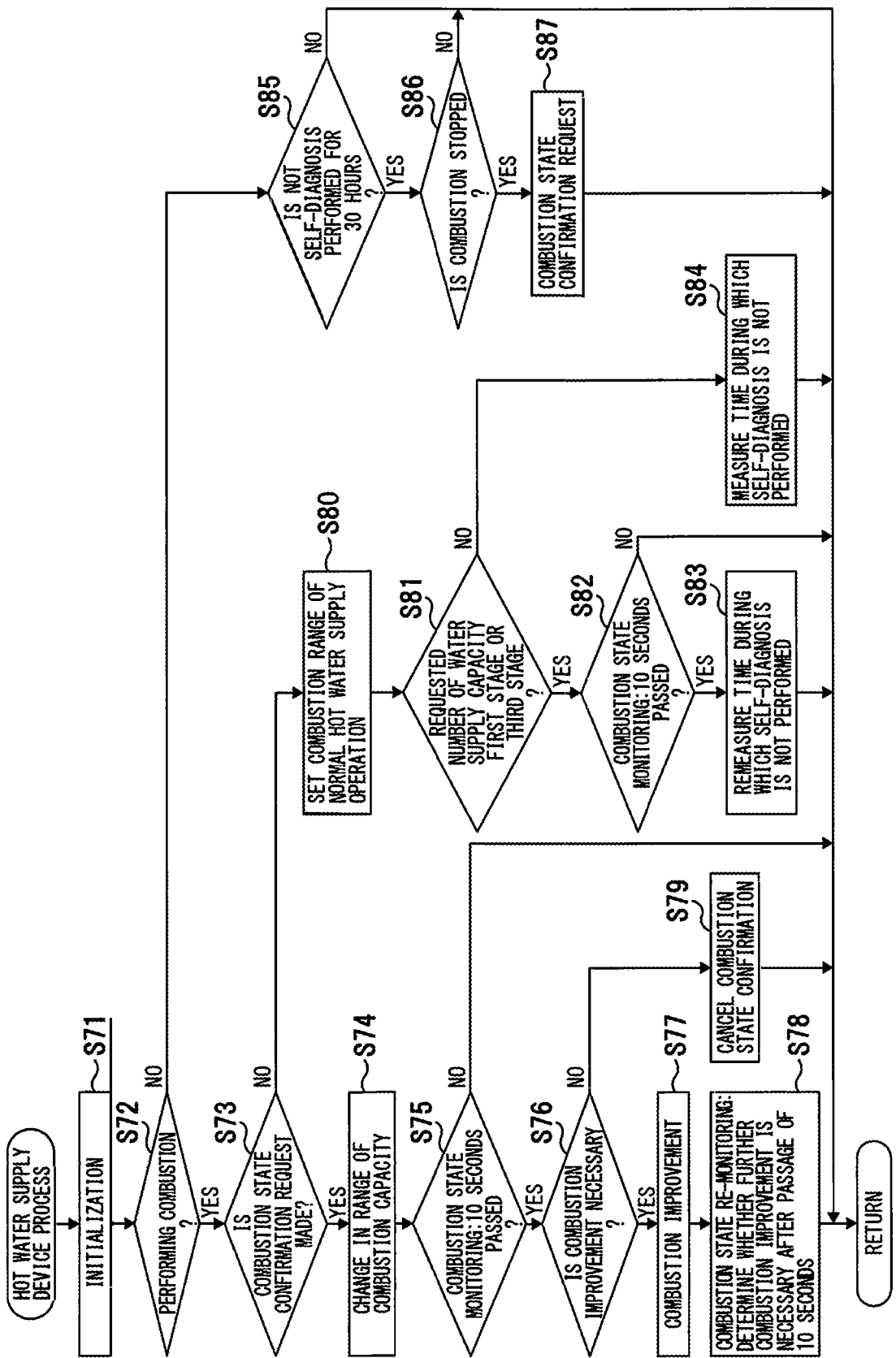
FIG. 15 is a flowchart showing an example of the hot water supply process according to Example 3.

FIG. 15 shows an example of a hot water supply process according to Example 3. The process procedure and process contents shown in FIG. 15 are examples, and the present invention is not limited to this configuration.

In this hot water supply process, a process of changing the range of the combustion capacity of the combustion part 4 is performed in the process of changing the combustion mode of the combustion part 4 when the hot water supply operation is continued in the second combustion mode.

At the start of the hot water supply operation or when a hot water supply request is received, the hot water supply device 40 performs operation preparation (initialization) (S71) and starts supplying hot water. The control device 90 then monitors whether the burners 48 are performing combustion (S72), and if the burners 48 are performing combustion (YES at S72), the control device 90 determines whether a combustion state confirmation request is made (S73). In the combustion state confirmation request, for example, a self-diagnosis process of the hot water supply device may be performed to determine whether the combustion of the burners 48 is continuously set in the second combustion mode as described above.

If the combustion state confirmation request is made (YES at S73), the combustion mode of the burners 48 is changed to the first combustion mode. In this case, the control device 90 changes the range of the combustion capacity set in the combustion part 4, for example (S74). In this case, in the combustion part 4, for example, the range of the combustion capacity of the first stage combustion is changed to Nos. 3 to 9, and the range of the combustion capacity of the third stage combustion is changed to Nos. 8 to 24. In the change in the range of the combustion capacity, for example, only one of the combustion capacity of the first stage combustion and the combustion capacity of the third stage combustion may be changed, or both of them may be changed.

After adjusting the range of the combustion capacity, the control device 90 performs the combustion state monitoring process for, for example, 10 [seconds] (YES at S75) and determines whether a combustion improvement is necessary (S76).

If the control device 90 determines that the combustion improvement is necessary (YES at S76), the control device 90 performs the combustion improvement process (S77) and performs the combustion state re-monitoring process for a combustion state confirmation time, for example, 10 [seconds], to determine whether a further combustion improvement is necessary (S78).

If the control device 90 determines that the combustion improvement is not necessary (NO at S76), the control device 90 cancels the combustion state confirmation process (S79).

If the combustion state confirmation request is not made (NO at S73), the control device 90 sets the combustion range of the normal hot water supply operation for the combustion part 4 (S80). In the combustion range in this case, for example, the range of combustion capacity of the first stage combustion is Nos. 3 to 8, the range of combustion capacity of the second stage combustion is Nos. 6 to 16, and the range of combustion capacity of the third stage combustion is Nos. 9 to 24. If the number of the water supply capacity for the hot water supply request is the first stage combustion or the third stage combustion corresponding to the first combustion mode (YES at S81), the control device 90 performs the combustion state monitoring process for, for example, 10 [seconds] (YES at S82) and resets the timer 22 to remeasure the time during which the self-diagnosis of the combustion state is not performed, i.e., the cumulative time TA (S83).

If the number of the water supply capacity for the hot water supply request is not the first stage combustion or the third stage combustion corresponding to the first combustion mode (NO at S81) and the combustion state cannot be monitored due to the second stage combustion, the control device 90 uses the timer 22 to measure the time during which the self-diagnosis of the combustion state is not performed (S84).

In the case that the combustion is not performed (NO at S72), if the self-diagnosis of the combustion state is not performed for the predetermined time TX, for example, 30 [hours] (YES at S85), and the hot water supply request is not made so that the combustion is stopped (YES at S86), the control device 90 generates a combustion state confirmation request (S87).

<Effects of Example 3>

According to Example 3, any of the following effects can be obtained.
 (1) By changing the range of the combustion capacity of the combustion part 4, hot water can be supplied in accordance with the hot water supply request even when the combustion state monitoring process and the combustion improvement process are performed.
 (2) Since the monitoring of the combustion state of the burners 48 and the improvement process of the combustion part 4 can regularly be performed, the reliability and safety of the hot water supply device can be enhanced.
 (3) Even when the burners 48 perform combustion with a large combustion amount in response to a hot water supply request, the combustion state of the burners can be monitored without reducing the combustion amount.
 (4) The hot water supply temperature can be prevented from becoming lower or higher than the set temperature in the combustion state monitoring process.

Modifications of the embodiments and examples described above are listed below.
 (1) In Example 2, the hot water supply temperature is raised so as to increase the combustion stage number; however, the present invention is not limited thereto.

For example, the hot water supply device 110 may provide control to achieve the third stage combustion by forcibly increasing the amount of water supplied from the water supply pipe 42 to increase the number of the water supply capacity of the hot water supply while maintaining the set temperature during the second stage combustion. In this case, the hot water supply device 110 may adjust an opening degree of a water tap or the water control valve 72 for mixing, for example.

(2) In the embodiments and examples, when the continuing second stage combustion reaches to the cumulative time TA, or when the next hot water supply operation is started, the combustion amount is changed to perform the monitoring of the combustion state and the combustion adjustment process; however, the present invention is not limited thereto. The hot water supply device may set the timing of changing the combustion stage number in accordance with a hot water supply load, for example. The control part 5 of the hot water supply device may determine the type of the hot water supply load by using, for example, the hot water supply amount, flow rate fluctuation information during hot water supply, switching of ON/OFF timing of hot water supply, a hot water supply set temperature, or other hot water supply instruction information. For example, when a long-time supply of a constant amount of hot water is requested, the control part 5 may determine that hot water is supplied to a bathtub etc. or hot water is supplied to equipment such as a common pipeline in which multiple hot water supply loads are disposed, or when a flow rate or on/off of hot water supply is intermittently repeated, the control part 5 may determine that hot water is supplied to a shower, a hot water supply port, etc. In the case of the hot water supply to equipment, for example, the hot water supply device performs processes of changing the combustion stage number and setting the combustion mode to the first combustion mode during hot water supply since the influence of fluctuations in flow rate and hot water supply temperature during hot water supply is small, and in the case of the hot water supply to a shower or a hot water supply port that may come into direct contact with the user, the hot water supply device may perform a process of setting the combustion mode to the first combustion mode at the start of the next hot water supply operation.

As described above, the most preferable embodiments etc. of the present invention have been described. The present invention is not limited to the above description. The present invention can variously be modified and altered by those skilled in the art based on the spirit of the invention described in claims or disclosed in the description of embodiments. These modifications and alterations naturally fall within the scope of the present invention.

INDUSTRIAL APPLICABILITY

The hot water supply device of the present invention is useful since, when the hot water supply process is continued in the combustion mode in which the combustion state of the burners cannot be detected, the hot water supply device can change the combustion mode of the combustion part to monitor the combustion state and perform an adjustment process of the combustion part, thereby maintaining and managing the combustion state of the burner in an appropriate state while suppressing the influence on the hot water supply process.

REFERENCE SIGNS LIST 2, 40, 110 hot water supply device
4 combustion part
5 control part
6-1 first burner part
6-2 second burner part
8 flame sensor
10 combustion control part
12 combustion adjustment control part
14-1, 14-2 gas supply pipe
16-1, 16-2 switching valve
18, 54 air supply fan
20 storage part
22 timer
24 combustion mode setting information
26 combustion state information
28 combustion adjustment information
30 cumulative time information
42 water supply pipe
44 hot water supply pipe
46 combustion chamber
48 burner
50, 52 heat exchanger
55 exhaust port
56 main gas electromagnetic valve
58 hot water supply gas proportional valve
60 spark plug
62 flame rod
64 igniter
66 drain receiver
68, 78, 82 temperature sensor
70 water amount sensor
72 water control valve for mixing
74 bypass pipe
76 hot water discharge pipe
80 water control valve
90 control device
92 processor
94 memory part
96 display part
98 communication part
112 combustion mode switching table

The invention claimed is:

1. A hot water supply device comprising:
a combustion part including a first burner part for which a flame sensor is disposed and a second burner part having a different number of burners from the first burner part such that one or both of the burner parts perform combustion, the flame sensor being configured to detect combustion state information of a flame generated by burners;
a combustion control part configured to monitor a combustion mode of the combustion part set in accordance with a hot water supply request and change a second combustion mode in which the first burner part does not perform combustion, to a first combustion mode in which at least the first burner part performs combustion, when the second combustion mode is continuing; and
a combustion adjustment control part configured to take in the combustion state information of the first burner part detected by the flame sensor and execute a combustion adjustment process of the combustion part, wherein the combustion control part adjusts a hot water supply set temperature or a water supply amount to change the combustion mode.

2. The hot water supply device according to claim 1, further comprising a timer configured to measure an elapsed time, wherein when a set time has elapsed after setting the second combustion mode, the combustion control part changes the combustion part to perform combustion in the first combustion mode until a certain time elapses.

3. The hot water supply device according to claim 1, wherein when the combustion mode is changed due to a monitoring result indicating that the combustion is performed in the second combustion mode, the combustion control part changes a range of a combustion capacity of the burners performing combustion in the first combustion mode.

4. A hot water supply device comprising:

a combustion part including a first burner part for which a flame sensor is disposed and a second burner part having a different number of burners from the first burner part such that one or both of the burner parts perform combustion, the flame sensor being configured to detect combustion state information of a flame generated by burners;

a combustion control part configured to monitor a combustion mode of the combustion part set in accordance with a hot water supply request and change a second combustion mode in which the first burner part does not perform combustion, to a first combustion mode in which at least the first burner part performs combustion, when the second combustion mode is continuing; and a combustion adjustment control part configured to take in the combustion state information of the first burner part detected by the flame sensor and execute a combustion adjustment process of the combustion part, wherein the combustion control part causes the combustion part to perform combustion in the first combustion mode at a start of a next combustion operation after the combustion in the second combustion mode is continuously set.

5. A hot water supply device comprising:

a combustion part including a first burner part for which a flame sensor is disposed and a second burner part having a different number of burners from the first burner part such that one or both of the burner parts perform combustion, the flame sensor being configured to detect combustion state information of a flame generated by burners;

a combustion control part configured to monitor a combustion mode of the combustion part set in accordance with a hot water supply request and change a second combustion mode in which the first burner part does not perform combustion, to a first combustion mode in which at least the first burner part performs combustion, when the second combustion mode is continuing;

a combustion adjustment control part configured to take in the combustion state information of the first burner part detected by the flame sensor and execute a combustion adjustment process of the combustion part; and an air supply fan configured to supply air to the burners, wherein the combustion adjustment control part adjusts the number of rotations of the air supply fan so that a combustion state of the combustion part satisfies a set condition.

6. A computer readable recording medium storing a hot water supply program for causing a computer to implement:

a function of monitoring a combustion mode of a combustion part set in accordance with a hot water supply request;

a function of changing, by adjusting a hot water supply set temperature or a water supply amount to change the combustion mode, a second combustion mode in which a first burner part does not perform combustion, to a first combustion mode in which at least the first burner part performs combustion, when the second combustion mode is continuing, a flame sensor being disposed for the first burner part, the flame sensor being configured to detect combustion state information of a flame; and a function of taking in the combustion state information of the first burner part detected by the flame sensor and executing a combustion adjustment process of the combustion part including the first burner part and a second burner part having a different number of burners from the first burner part.

7. The computer readable recording medium according to claim 6, wherein the hot water supply program further causes the computer to implement:

a function of measuring an elapsed time, and a function of changing the combustion part to perform combustion in the first combustion mode until a certain time elapses, when a set time has elapsed after setting the second combustion mode.

8. The computer readable recording medium according to claim 6, wherein the hot water supply program further causes the computer to implement a function of changing a range of a combustion capacity of the burners configured to perform combustion in the first combustion mode when the combustion mode is changed due to a monitoring result indicating that the combustion is performed in the second combustion mode.

9. A hot water supply method comprising:

monitoring a combustion mode of a combustion part set in accordance with a hot water supply request;

changing, by adjusting a hot water supply set temperature or a water supply amount to change the combustion mode, a second combustion mode in which a first burner part does not perform combustion, to a first combustion mode in which at least the first burner part performs combustion, when the second combustion mode is continuing, a flame sensor being disposed for the first burner part, the flame sensor being configured to detect combustion state information of a flame; and taking in the combustion state information of the first burner part detected by the flame sensor and executing a combustion adjustment process of the combustion part including the first burner part and a second burner part having a different number of burners from the first burner part.

10. The hot water supply method according to claim 9, further comprising:

measuring an elapsed time; and changing the combustion part to perform combustion in the first combustion mode until a certain time elapses, when a set time has elapsed after setting the second combustion mode.

11. The hot water supply method according to claim 9, further comprising changing a range of a combustion capacity of the burners configured to perform combustion in the first combustion mode when the combustion mode is changed due to a monitoring result indicating that the combustion is performed in the second combustion mode.

12. A computer readable recording medium storing a hot water supply program for causing a computer to implement:
- a function of monitoring a combustion mode of a combustion part set in accordance with a hot water supply request;
- a function of changing a second combustion mode in which a first burner part does not perform combustion, to a first combustion mode in which at least the first burner part performs combustion, when the second combustion mode is continuing, a flame sensor being disposed for the first burner part, the flame sensor being configured to detect combustion state information of a flame;
- a function of taking in the combustion state information of the first burner part detected by the flame sensor and executing a combustion adjustment process of the combustion part including the first burner part and a second burner part having a different number of burners from the first burner part; and
- a function of causing the combustion part to perform combustion in the first combustion mode at a start of a next combustion operation after the combustion in the second combustion mode is continuously set.

13. A computer readable recording medium storing a hot water supply program for causing a computer to implement:
- a function of monitoring a combustion mode of a combustion part set in accordance with a hot water supply request;
- a function of changing a second combustion mode in which a first burner part does not perform combustion, to a first combustion mode in which at least the first burner part performs combustion, when the second combustion mode is continuing, a flame sensor being disposed for the first burner part, the flame sensor being configured to detect combustion state information of a flame;
- a function of taking in the combustion state information of the first burner part detected by the flame sensor and executing a combustion adjustment process of the combustion part including the first burner part and a second burner part having a different number of burners from the first burner part; and
- a function of adjusting the number of rotations of an air supply fan configured to supply air to the first burner part and the second burner part so that a combustion state of the combustion part satisfies a set condition.

14. A hot water supply method comprising:
- monitoring a combustion mode of a combustion part set in accordance with a hot water supply request;
- changing a second combustion mode in which a first burner part does not perform combustion, to a first combustion mode in which at least the first burner part performs combustion, when the second combustion mode is continuing, a flame sensor being disposed for the first burner part, the flame sensor being configured to detect combustion state information of a flame;
- taking in the combustion state information of the first burner part detected by the flame sensor and executing a combustion adjustment process of the combustion part including the first burner part and a second burner part having a different number of burners from the first burner part; and
- causing the combustion part to perform combustion in the first combustion mode at a start of a next combustion operation after the combustion in the second combustion mode is continuously set.

15. A hot water supply method comprising:
- monitoring a combustion mode of a combustion part set in accordance with a hot water supply request;
- changing a second combustion mode in which a first burner part does not perform combustion, to a first combustion mode in which at least the first burner part performs combustion, when the second combustion mode is continuing, a flame sensor being disposed for the first burner part, the flame sensor being configured to detect combustion state information of a flame;
- taking in the combustion state information of the first burner part detected by the flame sensor and executing a combustion adjustment process of the combustion part including the first burner part and a second burner part having a different number of burners from the first burner part; and
- adjusting the number of rotations of an air supply fan configured to supply air to the first burner part and the second burner part so that a combustion state of the combustion part satisfies a set condition.

* * * * *